US012732001B2

(12) United States Patent
Liu et al.

(10) Patent No.: US 12,732,001 B2
(45) Date of Patent: Sep. 8, 2026

(54) METHOD AND APPARATUS OF FREQUENCY REGULATION OF POWER SYSTEM INVOLVING RENEWABLE ENERGY POWER GENERATION, DEVICE, AND STORAGE MEDIUM

(71) Applicant: TSINGHUA UNIVERSITY, Beijing (CN)

(72) Inventors: Feng Liu, Beijing (CN); Yun-Fan Zhang, Beijing (CN); Shi-Yong Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 484 days.

(21) Appl. No.: 18/228,431

(22) Filed: Jul. 31, 2023

(65) Prior Publication Data

US 2024/0047974 A1 Feb. 8, 2024

(30) Foreign Application Priority Data

Aug. 3, 2022 (CN) ......................... 202210927724.5

(51) Int. Cl.
*H02J 3/46* (2026.01)
*H02J 103/30* (2026.01)

(52) U.S. Cl.
CPC ............. *H02J 3/46* (2013.01); *H02J 2103/30* (2026.01)

(58) Field of Classification Search
CPC .......... H02J 3/46; H02J 2203/20; H02J 3/241; H02J 3/24; H02J 3/003; H02J 3/06; H02J 3/466; H02J 2203/10; H02J 2300/40
See application file for complete search history.

(56) References Cited

FOREIGN PATENT DOCUMENTS

| | | | | |
|---|---|---|---|---|
| CN | 110445194 A | * | 11/2019 | ................ H02J 3/48 |
| CN | 111162528 A | * | 5/2020 | ................ H02J 3/00 |
| CN | 112529312 A | | 3/2021 | |
| CN | 112668753 A | | 4/2021 | |
| CN | 114759605 A | * | 7/2022 | ............. H02J 3/241 |

OTHER PUBLICATIONS

Chinese Office Action (Application No. 2022109277245) , dated May 1, 2025, 8 pages.

* cited by examiner

*Primary Examiner* — Charles Cai

(57) ABSTRACT

A method and an apparatus of frequency regulation of a power system involving renewable energy power generation, a computer device, and a non-transitory computer readable storage medium are provided. The method includes: constructing a system frequency dynamic model according to parameters associated with power generator sets in the power system, where the power generator sets comprise a renewable energy power generator set and a conventional energy power generator set; calculating secure operation indexes of the power system according to the system frequency dynamic model of the power system; and obtaining system comprehensive cost indexes of the power system, constructing a reserve allocation model of the power generator sets according to the system comprehensive cost indexes and the secure operation indexes of the power system, and regulating a system frequency of the power system according to the reserve allocation model.

15 Claims, 9 Drawing Sheets

S201

Constructing a system frequency dynamic model according to parameters associated with power generator sets in the power system

S202

Calculating secure operation indexes of the power system according to the system frequency dynamic model of the power system

S203

Obtaining system comprehensive cost indexes of the power system, constructing a reserve allocation model of the power generator sets according to the system comprehensive cost indexes and the secure operation indexes of the power system, and regulating a system frequency of the power system according to the reserve allocation model

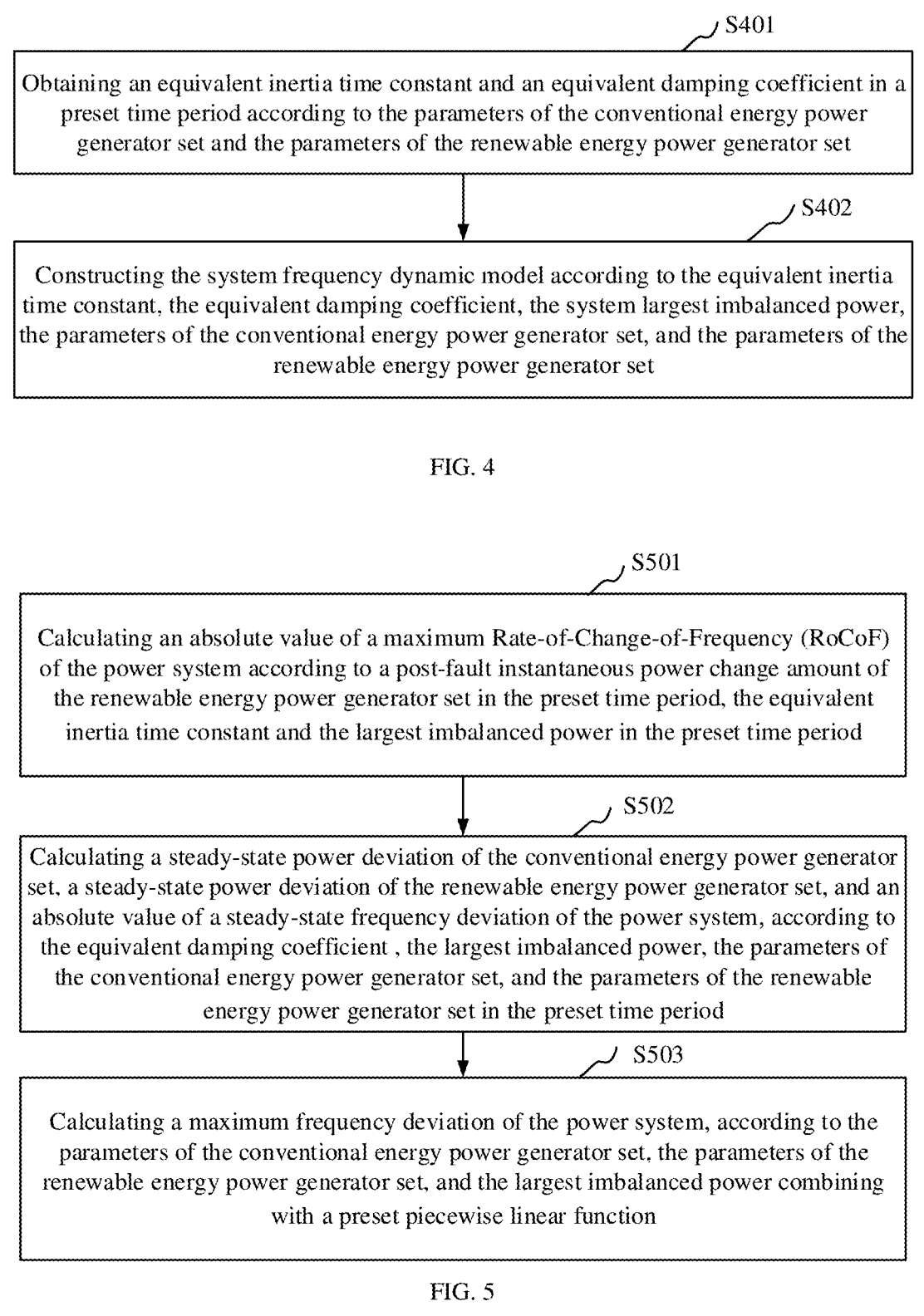

S401

Obtaining an equivalent inertia time constant and an equivalent damping coefficient in a preset time period according to the parameters of the conventional energy power generator set and the parameters of the renewable energy power generator set

S402

Constructing the system frequency dynamic model according to the equivalent inertia time constant, the equivalent damping coefficient, the system largest imbalanced power, the parameters of the conventional energy power generator set, and the parameters of the renewable energy power generator set

Calculating an absolute value of a maximum Rate-of-Change-of-Frequency (RoCoF) of the power system according to a post-fault instantaneous power change amount of the renewable energy power generator set in the preset time period, the equivalent inertia time constant and the largest imbalanced power in the preset time period

S502

Calculating a steady-state power deviation of the conventional energy power generator set, a steady-state power deviation of the renewable energy power generator set, and an absolute value of a steady-state frequency deviation of the power system, according to the equivalent damping coefficient , the largest imbalanced power, the parameters of the conventional energy power generator set, and the parameters of the renewable energy power generator set in the preset time period

S503

Calculating a maximum frequency deviation of the power system, according to the parameters of the conventional energy power generator set, the parameters of the renewable energy power generator set, and the largest imbalanced power combining with a preset piecewise linear function

FIG. 5

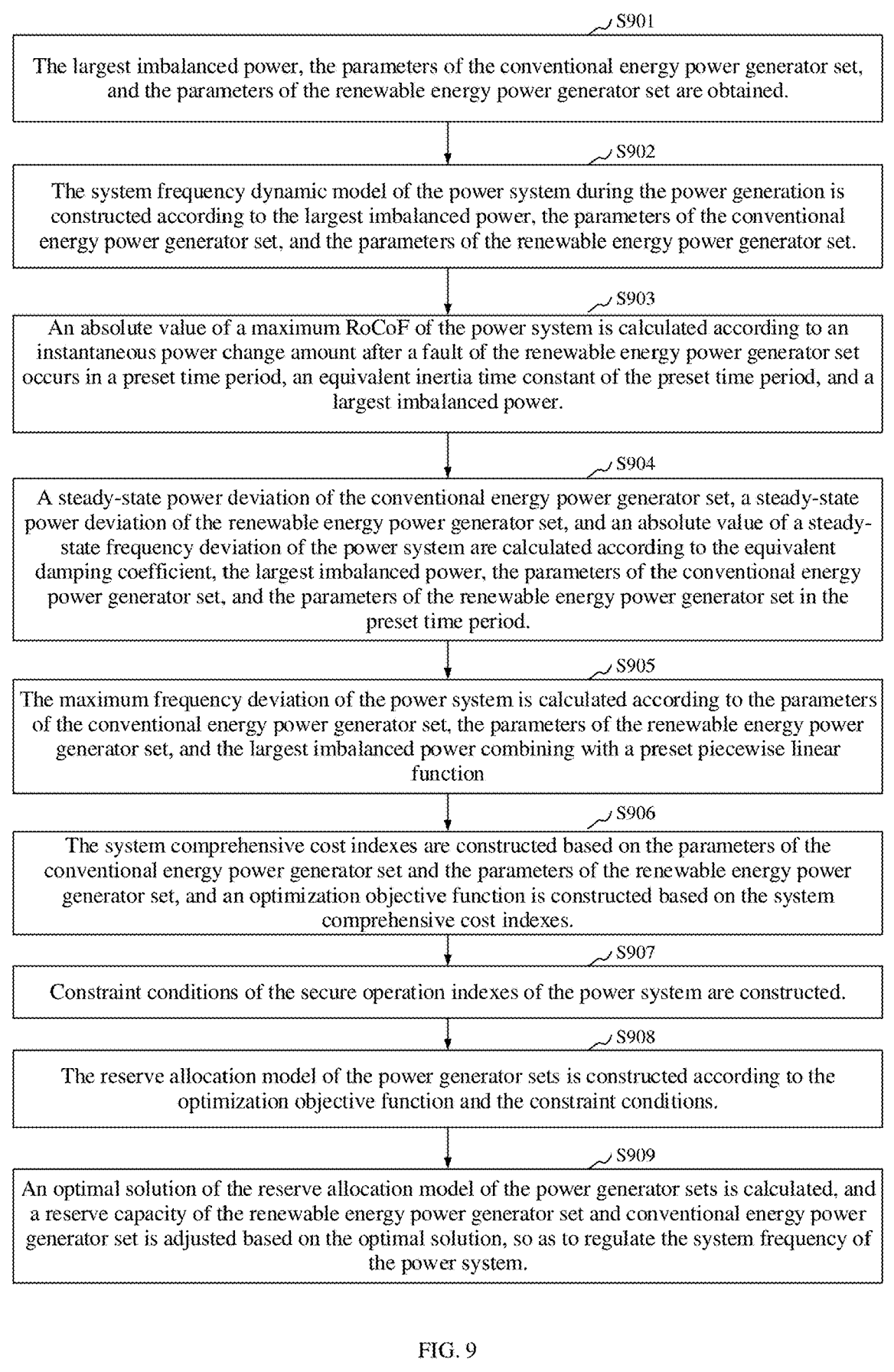

S901
The largest imbalanced power, the parameters of the conventional energy power generator set, and the parameters of the renewable energy power generator set are obtained.

S902
The system frequency dynamic model of the power system during the power generation is constructed according to the largest imbalanced power, the parameters of the conventional energy power generator set, and the parameters of the renewable energy power generator set.

S903
An absolute value of a maximum RoCoF of the power system is calculated according to an instantaneous power change amount after a fault of the renewable energy power generator set occurs in a preset time period, an equivalent inertia time constant of the preset time period, and a largest imbalanced power.

S904
A steady-state power deviation of the conventional energy power generator set, a steady-state power deviation of the renewable energy power generator set, and an absolute value of a steady-state frequency deviation of the power system are calculated according to the equivalent damping coefficient, the largest imbalanced power, the parameters of the conventional energy power generator set, and the parameters of the renewable energy power generator set in the preset time period.

S905
The maximum frequency deviation of the power system is calculated according to the parameters of the conventional energy power generator set, the parameters of the renewable energy power generator set, and the largest imbalanced power combining with a preset piecewise linear function S906
The system comprehensive cost indexes are constructed based on the parameters of the conventional energy power generator set and the parameters of the renewable energy power generator set, and an optimization objective function is constructed based on the system comprehensive cost indexes.

S907
Constraint conditions of the secure operation indexes of the power system are constructed.

S908
The reserve allocation model of the power generator sets is constructed according to the optimization objective function and the constraint conditions.

S909
An optimal solution of the reserve allocation model of the power generator sets is calculated, and a reserve capacity of the renewable energy power generator set and conventional energy power generator set is adjusted based on the optimal solution, so as to regulate the system frequency of the power system.

FIG. 9

METHOD AND APPARATUS OF FREQUENCY REGULATION OF POWER SYSTEM INVOLVING RENEWABLE ENERGY POWER GENERATION, DEVICE, AND STORAGE MEDIUM

CROSS-REFERENCE TO RELATED APPLICATION

The present application claims the priority of Chinese Patent Application No. 202210927724.5, filed on Aug. 3, 2022, entitled "Method and Apparatus of Frequency Regulation of Power System Involving Renewable Energy Power Generation, Device, and Storage Medium", which is hereby incorporated by reference in its entirety.

TECHNICAL FIELD

The present disclosure relates to the field of dispatch and control of a power system operation, and more particularly, to a method and an apparatus of frequency regulation of a power system involving renewable energy power generation, a device, and a storage medium.

BACKGROUND

To reduce carbon emissions, renewable energy will become a main part of newly added energy source in a new power system in future and will predominate in the power structure. For example, in a power system, the proportion of renewable energy generator sets to all generator sets is continuously increasing. However, since the renewable energy generator sets have the characteristic of "low inertia", as the proportion of the renewable energy generator sets in the power system becomes higher and higher, the whole power system will present the characteristic of "low inertia". The inertia is an index for characterizing the ability of a generator set to stabilize the system frequency fluctuation. Therefore, if the entire power system exhibits the characteristic of "low inertia", a large frequency fluctuation or even frequency insecurity events may be easily caused when a generation outage occurs.

Therefore, how to allocate sufficient frequency reserve of conventional and renewable generators with minimum cost to reduce the frequency fluctuation and guarantee frequency security becomes an urgent technical issue to be resolved.

SUMMARY

In view of the above technical problem, a method and an apparatus of frequency regulation of a power system involving renewable energy power generation, a computer device, and a non-transitory computer-readable storage medium are provided for reducing frequency fluctuation and guaranteeing frequency security.

In a first aspect, the present disclosure provides a method of frequency regulation of a power system involving renewable energy power generation. The method includes: constructing a system frequency dynamic model according to parameters associated with power generator sets in the power system, where the power generator sets include a renewable energy power generator set and a conventional energy power generator set; calculating secure operation indexes of the power system according to the system frequency dynamic model of the power system; and obtaining system comprehensive cost indexes of the power system, constructing a reserve allocation model of the power generator sets according to the system comprehensive cost indexes and the secure operation indexes of the power system, and regulating a system frequency of the power system according to the output of the reserve allocation model.

In a second aspect, the present disclosure provides an apparatus of frequency regulation of a power system involving renewable energy power generation. The apparatus includes: a model construction module, a calculation module, and a frequency regulation module.

The model construction module is configured to construct a post-fault system frequency dynamic model of the power system according to parameters associated with power generator sets in the power system.

The calculation module is configured to calculate secure operation indexes of the power system according to the system frequency dynamic model of the power system.

The frequency regulation module is configured to obtain system comprehensive cost indexes of the power system, construct a reserve allocation model of the power generator sets according to the system comprehensive cost indexes and the secure operation indexes of the power system, and regulate a system frequency of the power system according to the reserve allocation model.

In a third aspect, the present disclosure provides a computer device. The computer device includes a memory and a processor. A computer program is stored in the memory. The processor, when executing the computer program, performs the steps of the method of the first aspect.

In a fourth aspect, the present disclosure provides a non-transitory computer readable storage medium. The non-transitory computer readable storage medium has a computer program stored thereon. The computer program, when executed by a processor, causes the processor to perform the steps of the method of the first aspect.

In the above method and apparatus of frequency regulation of the power system involving renewable energy power generation, the computer device, and the computer readable storage medium. The system frequency dynamic model is constructed according to the parameters associated with the power generator sets in the power system. The power generator sets include the renewable energy power generator set and the conventional energy power generator set, so that the constructed system frequency dynamic model can be applied to the power system involving the renewable energy power generator set, and can provide a basis for analyzing the frequency performance of the power system when a fault occurs in the power system involving the renewable energy power generator set. Then, the secure operation indexes of the power system are calculated according to the system frequency dynamic model of the power system. Finally, the reserve allocation model of the conventional and renewable power generator sets is constructed according to the system comprehensive cost indexes and the secure operation indexes of the power system, and the system frequency of the power system is regulated according to the output of the reserve allocation model. Thus, when a fault occurs in the power system involving the renewable energy power generator set, the system frequency of the power system can be regulated using the reserve capacity determined by the reserve allocation model, thereby reducing the frequency fluctuation of the power system, and ensuring the security of the post-fault frequency of the power system.

BRIEF DESCRIPTION OF THE DRAWINGS

FIG. 4 is a schematic flow diagram of a method of frequency regulation of the power system involving renewable energy power generation in accordance with yet another embodiment.

FIG. 5 is a schematic flow diagram of a method of frequency regulation of the power system involving renewable energy power generation in accordance with yet another embodiment.

FIG. 9 is a schematic flow diagram of a method of frequency regulation of the power system involving renewable energy power generation in accordance with yet another embodiment.

DETAILED DESCRIPTION OF THE EMBODIMENTS

In order to make the objectives, technical solutions, and advantages of the present disclosure more apparent and understandable, the present disclosure will be explained in detail below in conjunction with the accompanying drawings and the embodiments. It should be understood that the specific embodiments described herein are only used to explain the present disclosure but not intended to limit it.

Figure 1:
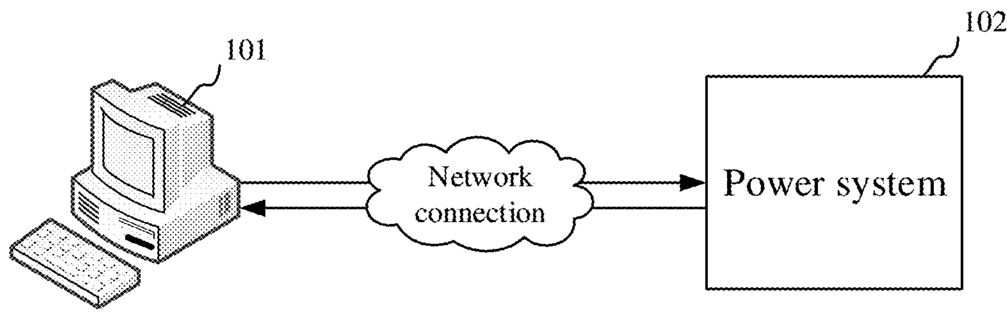
FIG. 1 shows an application environment diagram of a method of frequency regulation of a power system involving renewable energy power generation in accordance with an embodiment.

A method of frequency regulation of a power system involving renewable energy power generation is provided in embodiments of the present disclosure. The method may be applied to an application environment shown in FIG. 1. As shown in FIG. 1, a computer device 101 communicates with a power system 102 through a network. The power system 102 includes power generator sets. The computer device 101 may construct a frequency dynamic model of the power system 102 according to parameters associated with power generator sets in the power system 102. The power generator sets include a renewable energy power generator set and a conventional energy power generator set. A secure operation index of the power system 102 is calculated according to the system frequency dynamic model of the power system 102. A system comprehensive cost index of the power system 102 is obtained, and a reserve allocation model of the power generator sets is constructed according to the system comprehensive cost index and the secure operation index of the power system 102, and a system frequency of the power system 102 is regulated by the reserve determined via the allocation model. The computer device 101 may be, but is not limited to, various personal computers and laptops.

Figure 2:
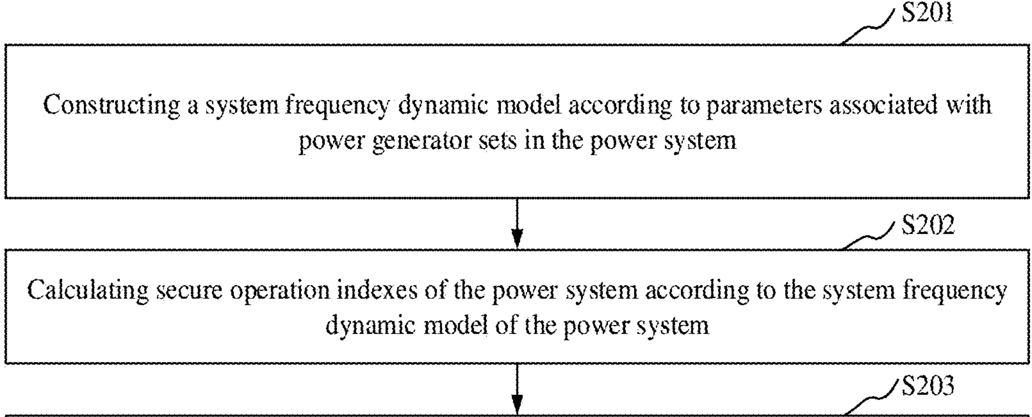
FIG. 2 is a schematic flow diagram of a method of frequency regulation of the power system involving renewable energy power generation in accordance with an embodiment.

In an embodiment, as shown in FIG. 2, a method of frequency regulation of the power system involving renewable energy power generation is provided. The method is described by taking it applied to the application environment shown in FIG. 1 as an example, and may include the following steps S201 to S203.

At step S201, a system frequency dynamic model is constructed according to parameters associated with power generator sets in the power system, where the power generator sets include a renewable energy power generator set and a conventional energy power generator set.

The renewable energy power generator set is an alternator whose rotor speed is different from the rotation speed of the rotating magnetic field of the stator, and the conventional energy power generator set is an alternator whose rotor speed is the same as the rotation speed of the rotating magnetic field of the stator.

The parameters associated with the power generator sets include parameters of the conventional energy power generator set and parameters of the renewable energy power generator set. The parameters of the conventional energy power generator set include an inertia time constant $$H_i^{gen}$$

a damping coefficient $$d_i^{gen}$$

a time constant $$t_i^{gen}$$

and a speed governor coefficient $$\alpha_i^{gen}$$

$\cdot N_G$ denotes a group of conventional energy power generator sets, while $n_G$ denotes the number of the conventional energy power generator sets in the group. The parameters of the renewable energy power generator set include a virtual inertia time constant $$k_j^{inertia}$$

of the renewable energy power generator set j, and a droop control coefficient $$k_j^{droop}$$

of the renewable energy power generator set $j \cdot N_W$ denotes a group of renewable energy power generator sets, while $n_W$ denotes the number of the renewable energy power generator sets in the group.

The post-fault system frequency dynamic model in a time period k is constructed by expressions (1) to (7).

$$2H_{sys}^{(k)}\Delta f(t) = -D_{sys}^{(k)}\Delta f(t) + \sum_{i\in N_G}\Delta P_i^{gen}(t) + \sum_{j\in N_W}\Delta P_j^{wind}(t) - P_{loss}^{(k)} \quad (1)$$

$$H_{sys}^{(k)} = \sum_{i\in N_G} v_{i,k}^{gen} H_i^{gen} \quad (2)$$

$$D_{sys}^{(k)} = \sum_{i\in N_G} v_{i,k}^{gen} d_i^{gen} \quad (3)$$

$$\begin{cases} \tau_i^{gen}\Delta P_i^{gen}(t) = -\Delta P_i^{gen}(t) - \alpha_i^{gen}\Delta f(t), \text{ if } v_{i,k}^{gen} = 1, \forall\, i \in N_G \\ \Delta P_i^{gen}(t) = 0, \text{ if } v_{i,k}^{gen} = 0, \forall\, i \in N_G \end{cases} \quad (4)$$

$$|\Delta P_i^{gen}(t)| \le PR_{i,k}^{gen}, \forall\, i \in N_G \quad (5)$$

$$\begin{cases} \Delta P_j^{wind}(t) = -k_j^{inertia}\Delta f(t) - k_j^{droop}\Delta f(t), \text{ if } v_{j,k}^{wind} = 1, \forall\, j \in N_W \\ \Delta P_j^{wind}(t) = 0, \text{ if } v_{j,k}^{wind} = 0, \forall\, j \in N_W \end{cases} \quad (6)$$

$$\left|\Delta P_j^{wind}(t)\right| \le PR_{j,k}^{wind}, \forall\, j \in N_W \quad (7)$$

In these expressions, $$H_{sys}^{(k)}$$

represents an equivalent inertia time constant, $$D_{sys}^{(k)}$$

represents an equivalent damping coefficient, Δf(t) represents a frequency deviation of a frequency of a center of inertia (COI) of the power system, $$\Delta P_i^{gen}(t)$$

represents a power regulation amount of the conventional energy power generator set i, $$\Delta P_j^{wind}(t)$$

represents a power regulation amount of the renewable energy power generator set j, $$P_{loss}^{(k)}$$

represents a largest imbalanced power, a Boolean variable $$v_{i,k}^{gen}$$

represents whether the conventional energy power generator set i participates in the primary frequency regulation or not in a time period k, a Boolean variable $$v_{j,k}^{wind}$$

represents whether the renewable energy power generator set j participates in the primary frequency regulation in the time period k, $$PR_{i,k}^{gen}$$

represents a primary frequency-regulation reserve capacity of the conventional energy power generator set i in the time period k, and $$PR_{j,k}^{wind}$$

represents a primary k frequency-regulation reserve capacity of the renewable energy power generator set j in the time period k.

The system frequency dynamic model is constructed by expressions (1) to (7) according to the parameters associated with the renewable energy power generator set and the conventional energy power generator set in the power system.

At step S202, secure operation indexes of the power system are calculated according to the system frequency dynamic model of the power system.

The secure operation indexes of the power system include an absolute value of a maximum Rate-of-Change-of-Frequency (RoCoF) of the power system, an absolute value of a steady-state frequency deviation of the power system, and a maximum frequency deviation of the power system. These indexes are important indexes for evaluating the post-fault power system.

The absolute value of the maximum RoCoF of the power system, the absolute value of the steady-state frequency deviation of the power system, and the maximum frequency deviation of the power system are calculated according to the system frequency dynamic model of the power system.

At step S203, system comprehensive cost indexes of the power system are obtained, and a reserve allocation model of the power generator sets is constructed according to the system comprehensive cost indexes and the secure operation indexes of the power system, and a system frequency of the power system is regulated according to the output of the reserve allocation model.

The system comprehensive cost indexes include a decision variable $u_{i,k}$, which represents an on/off state of the conventional energy power generator set i in the time period k·

$$z_{i,k}^{SU}$$

and $$z_{i,k}^{SD}$$

represent startup and shutdown actions of the conventional energy power generator set i in the time period k, respectively.

$$P_{i,k}^{gen}$$

represents a planned output of the conventional energy power generator set i in the time period k·

$$\Delta P_{j,k}^{wind}$$

represents an actual output of the renewable energy power generator set j in the time period k·

$$PR_{i,k}^{gen},\ SR_{i,k}^{gen} \text{ and } TR_{i,k}^{gen}$$

represent a primary frequency-regulation reserve capacity, a secondary frequency-regulation reserve capacity, and a tertiary frequency-regulation reserve capacity of the conventional energy power generator set i in the time period k, respectively;

$$PR_{j,k}^{wind},\ SR_{j,k}^{wind} \text{ and } TR_{j,k}^{wind}$$

represent a primary frequency-regulation reserve capacity, a secondary frequency-regulation reserve capacity, and a tertiary frequency-regulation reserve capacity of the renewable energy power generator set j in the time period k, respectively.

$$z_{i,k}^{gen}$$

represents the post-fault secondary frequency-regulation reserve deployment of the conventional energy power generator set i in the time period k; and $$z_{j,k}^{wind}$$

represents the post-fault secondary frequency-regulation reserve deployment of the renewable energy power generator set j in the time period k.

An objective function and constraint conditions are constructed according to the system comprehensive cost indexes of the power system. The reserve allocation model of the power generator sets is constructed taking the absolute value of the maximum RoCoF of the power system, the absolute value of the steady-state frequency deviation of the power system, and the maximum frequency deviation of the power system as the constraint conditions. The system frequency of the power system is regulated according to the reserve allocation model.

In the above embodiment, the system frequency dynamic model is constructed according to the parameters in the power system, which are associated with the power generator sets, thus laying a foundation for analyzing post-fault frequency performance of the power system. By calculating the secure operation indexes of the power system according to the system frequency dynamic model of the power system, the accuracy of evaluation of the post-fault frequency performance of the power system is improved, and a strong adaptability for the power system with a high proportion of renewable energy is achieved. By constructing the reserve allocation model of the power generator sets according to the system comprehensive cost indexes and the secure operation indexes of the power system, and by regulating the system frequency of the power system by means of the reserve allocation model, the frequency fluctuation of the power system is reduced, thereby ensuring the security of the post-fault power system frequency, and balancing security and economy.

Figure 3:
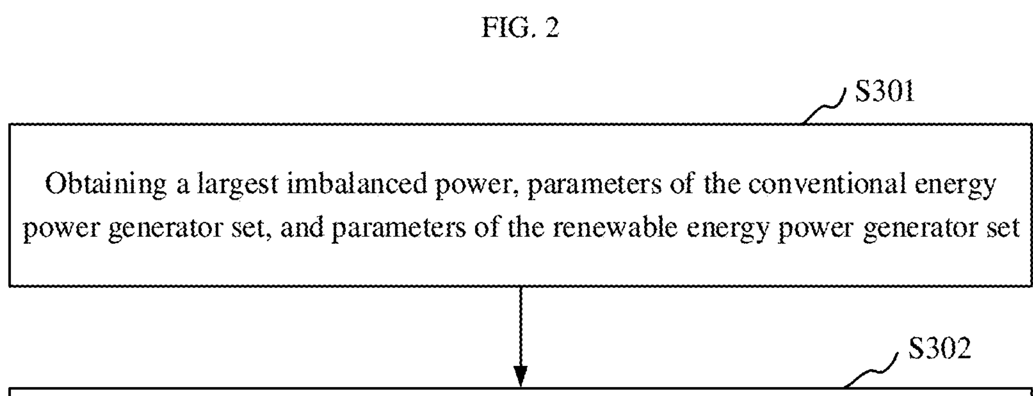
FIG. 3 is a schematic flow diagram of a method of frequency regulation of the power system involving renewable energy power generation in accordance with another embodiment.

In an embodiment, as shown in FIG. 3, the step S201 of constructing the system frequency dynamic model according to the parameters in the power system, which are associated with the power generator sets, may include step S301 and step S302.

At step S301, a largest imbalanced power, parameters of the conventional energy power generator set, and parameters of the renewable energy power generator set are obtained.

The largest imbalanced power is a difference between an actual power and a rated power of the power system due to a fault, namely, an outage of the largest generator set in the power system.

The largest imbalanced power $$P_{loss}^{(k)}$$

of the power system, the parameters of the conventional energy power generator set, and the parameters of the renewable energy power generator set are obtained.

At step S302, the frequency dynamic model is constructed according to the largest imbalanced power, the parameters of the conventional energy power generator sets, and the parameters of the renewable energy power generator sets.

The system frequency dynamic model is constructed according to the largest imbalanced power $P_{loss}^{(k)}$ of the power system, the parameters of the conventional energy power generator set, and the parameters of the renewable energy power generator set.

In the above embodiment, the largest imbalanced power, the parameters of the conventional energy power generator set, and the parameters of the renewable energy power generator set are obtained. The system frequency dynamic model is constructed according to the largest imbalanced power, the parameters of the conventional energy power generator set, and the parameters of the renewable energy power generator set, so that the post-fault frequency performance of the power system may be analyzed.

In an embodiment, as shown in FIG. 4, the step S302 of constructing the system frequency dynamic model according to the largest imbalanced power, the parameters of the conventional energy power generator set, and the parameters of the renewable energy power generator set, may include step S401 and step S402.

At step S401, an equivalent inertia time constant and an equivalent damping coefficient of a preset time period are obtained according to the parameters of the conventional energy power generator set and the parameters of the renewable energy power generator set.

The equivalent damping coefficient is a ratio of a rated load impedance of the power system to an output impedance of an electrical drive source of the power system, and the inertia time constant represents a step response time of the power system.

$H_{sys}^{(k)}$ represents the equivalent inertia time constant, and $D_{sys}^{(k)}$ represents the equivalent damping coefficient. The preset time period may be 10 minutes, or one hour, etc., and is not limited specifically in the embodiments of the present disclosure, but may be configured according to the actual situations.

The formulae for calculating the equivalent inertia time constant $D_{sys}^{(k)}$ and for the equivalent damping coefficient $H_{sys}^{(k)}$ are shown in the above expressions (2) and (3), respectively. In the expressions (2) and (3), $H_i^{gen}$ represents the inertia time constant, $d_i^{gen}$ represents the damping coefficient, and the Boolean variable $v_{i,k}^{gen}$ represents whether the conventional energy power generator set i participates in the primary frequency regulation or not in the time period k.

At step S402, the system frequency dynamic model is constructed according to the equivalent inertia time constant, the equivalent damping coefficient, the largest imbalanced power, the parameters of the conventional energy power generator set, and the parameters of the renewable energy power generator set.

The parameters of the conventional energy power generator set include: a time constant $\tau_i^{gen}$, a speed governor coefficient $\alpha_i^{gen}$, a primary frequency-regulation reserve capacity $PR_{i,k}^{gen}$ of the conventional energy power generator set i in the time period k, and a Boolean variable $v_{i,k}^{gen}$ representing whether the conventional energy power generator set i participates in the primary frequency regulation or not in the time period k·$N_G$ represents a group of conventional energy power generator sets, and $n_G$ represents the number of the conventional energy power generator sets in the group.

The parameters of the renewable energy power generator set include: a virtual inertia time constant $k_j^{inertia}$ of the renewable energy power generator set j, a droop control coefficient $$k_j^{droop}$$

of the renewable energy power generator set j, a ratio, denoted as $$s_j = k_j^{droop} / k_j^{inertia}$$

of the droop control coefficient to the virtual inertia time constant, a primary frequency-regulation reserve capacity $$PR_{j,k}^{wind}$$

of the renewable energy power generator set j in the time period k, and a Boolean variable $$v_{j,k}^{wind}$$

representing whether the renewable energy power generator set i participates in the primary frequency regulation or not in the time period k·$N_W$ represents a group of renewable energy power generator sets, and $n_W$ represents the number of the renewable energy power generator sets in the group.

Based on expression (1), the system frequency dynamic model is constructed according to the parameters of the conventional energy power generator set, the parameters of the renewable energy power generator set, and the equivalent inertia time constant $$H_{sys}^{(k)}$$

the equivalent damping coefficient $$D_{sys}^{(k)}$$

and the largest imbalanced power $$P_{loss}^{(k)}$$

of the power system in the preset time period.

The frequency deviation of the frequency of the COI of the power system, the power regulation amount of the conventional energy power generator set, and the power regulation amount of the renewable energy power generator set each are obtained according to the system frequency dynamic model. Specifically, based on the system frequency dynamic model, the frequency deviation $\Delta f(t)$ of the frequency of the COI of the power system is obtained according to according to expression (1). The formulae for calculating the power regulation amount $$\Delta P_i^{gen}(t)$$

of the conventional energy power generator set and the power regulation amount $$\Delta P_j^{wind}(t)$$

of the renewable energy power generator set are shown in the above expressions (4) to (7).

The above expressions (5) and (7) indicate that the absolute value of the power regulation amount $$\Delta P_i^{gen}(t)$$

of the conventional energy power generator set and the absolute value of the power regulation amount $$\Delta P_j^{wind}(t)$$

of the renewable energy power generator set need to be less than or equal to the primary frequency-regulation reserve capacity $$PR_{i,k}^{gen}$$

of the conventional energy power generator set i in the time period k and the primary frequency-regulation reserve capacity $$PR_{j,k}^{wind}$$

of the renewable energy power generator set j in the time period k, respectively. A non-linear amplitude limiting is taken into account in the expressions (5) and (7). The non-linear amplitude limiting specifically refers to the amplitude limiting for the power regulation amount of the conventional energy power generator set and the renewable energy power generator set during the primary frequency regulation.

The power regulation amount $$\Delta P_i^{gen}(t)$$

of the conventional energy power generator set is calculated based on whether the conventional energy power generator set i participates in the primary frequency regulation or not in the time period k. The power regulation amount $$\Delta P_i^{gen}(t)$$

of the conventional energy power generator set is calculated according to $$\tau_i^{gen}\Delta \dot{P}_i^{gen}(t) = -\Delta P_i^{gen}(t) - \alpha_i^{gen}(t)\Delta f(t),$$

if the conventional energy power generator set i participates in the primary frequency regulation in the time period k. The power regulation amount $$\Delta P_i^{gen}(t)$$

of the conventional energy power generator set is 0 if the conventional energy power generator set i does not participate in the primary frequency regulation in the time period k.

The power regulation amount $$\Delta P_j^{wind}(t)$$

of the renewable energy power generator set is calculated based on whether the renewable energy power generator set j participates in the primary frequency regulation or not in the time period k. The power regulation amount $$\Delta P_j^{wind}(t)$$

of the renewable energy power generator set is calculated according to $$\Delta P_j^{wind}(t) = -k_j^{inertia}\Delta \dot{f}(t) - k_j^{droop}\Delta f(t)$$

if the renewable energy power generator set i participates in the primary frequency regulation in the time period k. The power regulation amount $$\Delta P_j^{wind}(t)$$

of the renewable energy power generator set is 0 if the renewable energy power generator set j does not participate in the primary frequency regulation in the time period k.

In the above embodiments, the equivalent inertia time constant and the equivalent damping coefficient in the preset time period are obtained according to the parameters of the conventional energy power generator set and the parameters of the renewable energy power generator set, and the system frequency dynamic model is constructed according to the equivalent inertia time constant, the equivalent damping coefficient, the largest imbalanced power, the parameters of the conventional energy power generator set, and the parameters of the renewable energy power generator set. The power regulation amount is determined based on whether the conventional energy power generator set and the renewable energy power generator set participate in the primary frequency regulation or not, and the non-linear amplitude limiting is taken into account, so that the constructed system frequency dynamic model may be more accurate.

In an embodiment, as shown in FIG. 5, the step S202 of calculating the secure operation indexes of the power system according to the system frequency dynamic model of the power system, may include steps S501 to S503.

At step S501, an absolute value of a maximum RoCoF of the power system is calculated according to a post-fault instantaneous power change amount of the renewable energy power generator set in the preset time period, and an equivalent inertia time constant and the largest imbalanced power in the preset time period.

The absolute value $$RoCoF_{max}^{(k)}$$

of the maximum RoCoF of the power system is calculated by expression (8) and expression (9), wherein $$\Delta P_{wini\_j}^{(k)}$$

represents the post-fault instantaneous power change amount of the renewable energy power generator set in the preset time period, where the instantaneous power support is achieved by a virtual inertia control, $$P_{loss}^{(k)}$$

represents the largest imbalanced power, $$H_{sys}^{(k)}$$

represents the equivalent inertia time constant, the Boolean variable $$v_{j,k}^{wind}$$

represents whether the renewable energy power generator set j participates in the primary frequency regulation in the time period k, $$k_j^{inertia}$$

represents the virtual inertia time constant of the renewable energy power generator set j, $$PR_{j,k}^{wind}$$

represents the primary frequency-regulation reserve capacity of the renewable energy power generator set j in the time period k, and M represents a sufficiently large positive number.

$$-2H_{sys}^{(k)} \times RoCoF_{max}^{(k)} = -P_{loss}^{(k)} + \sum_{j} \Delta P_{wini\_j}^{(k)} \tag{8}$$

$$\Delta P_{wini\_j}^{(k)} = v_{j,k}^{wind} \times \min\{k_j^{inertia} \times RoCoF_{max}^{(k)}, PR_{j,k}^{wind}\}, \forall j \tag{9}$$

Since the equations (8) and (9) contain non-linear terms that are not beneficial to calculation, the equations may be accurately linearized by introducing continuous auxiliary variables $$s_{j,k}^1$$

and $$s_{jk}^2,$$

and a Boolean auxiliary variable $$q_{j,k}^1$$

$\in \{0, 1\}$. Thus, equations (8) and (9) are equivalent to mixed integer linear constraint expressions (10) to (17).

$$k_j^{inertia} RoCoF_{max}^{(k)} - Mq_{j,k}^1 \leq s_{j,k}^1 \tag{10}$$

$$s_{j,k}^1 \leq k_j^{inertia} RoCoF_{max}^{(k)} \tag{11}$$

$$PR_{j,k}^{wind} - M(1 - q_{j,k}^1) \leq s_{j,k}^1 \leq PR_{j,k}^{wind} \tag{12}$$

$$-Mv_{j,k}^{wind} \leq \Delta P_{wini\_j}^{(k)} \leq s_{j,k}^1 + M(1 - v_{j,k}^{wind}) \tag{13}$$

$$s_{j,k}^1 - M(1 - v_{j,k}^{wind}) \leq \Delta P_{wini\_j}^{(k)} \leq Mv_{j,k}^{wind} \tag{14}$$

$$-Mv_{i,k}^{gen} \leq s_{i,k}^2 \leq RoCoF_{max}^{(k)} + M(1 - v_{i,k}^{gen}) \tag{15}$$

$$RoCoF_{max}^{(k)} - M(1 - v_{i,k}^{gen}) \leq s_{i,k}^2 \leq Mv_{i,k}^{gen} \tag{16}$$

$$2\sum_{i} H_i^{gen} s_{i,k}^2 = -P_{loss}^{(k)} + \sum_{j} \Delta P_{wini\_j}^{(k)} \tag{17}$$

The absolute value of the maximum RoCoF of the power system $$RoCoF_{max}^{(k)}$$

is obtained by substituting the post-fault instantaneous power change amount $$\Delta P_{wini\_j}^{(k)}$$

of the renewable energy power generator set in the preset time period, and the equivalent inertia time constant $$H_{sys}^{(k)}$$

and the largest imbalanced power $$P_{loss}^{(k)}$$

of the power system in the preset time period into the expression (8).

At step S502, a steady-state power deviation of the conventional energy power generator set, a steady-state power deviation of the renewable energy power generator set, and an absolute value of a steady-state frequency deviation of the power system are calculated according to the equivalent damping coefficient, the largest imbalanced power, the parameters of the conventional energy power generator set, and the parameters of the renewable energy power generator set in the preset time period.

The steady-state power deviation $$\Delta P_{gss\_i}^{(k)}$$

of the conventional energy power generator set, the steady-state power deviation $$\Delta P_{wss\_j}^{(k)}$$

of the renewable energy power generator set, and the absolute value of the steady-state frequency deviation $$\Delta f_{ss}^{(k)}$$

of the power system are calculated according to equations (18) to (20). In equations (18) to (20), $$\Delta P_{gss\_i}^{(k)}$$

represents the steady-state power deviation of the conventional energy power generator set, $$\Delta P_{wss\_j}^{(k)}$$

represents the steady-state power deviation of the renewable energy power generator set, $$D_{sys}^{(k)}$$

l represents the equivalent damping coefficient of the preset time period, $$P_{loss}^{(k)}$$

represents the largest imbalanced power, $$\alpha_i^{gen}$$

represents a coefficient of a governor, $$k_j^{droop}$$

represents the droop control coefficient of the renewable energy power generator set j, $$PR_{i,k}^{gen}$$

represents the primary frequency-regulation reserve capacity of the conventional energy power generator set i in the time period k, $$PR_{j,k}^{wind}$$

represents the primary frequency-regulation reserve capacity of the renewable energy power generator set j in the time period k, the Boolean variable $$v_{i,k}^{gen}$$

represents whether the conventional energy power generator set i participates in the primary frequency regulation or not in the time period k, and the Boolean variable $$v_{j,k}^{wind}$$

represents whether the renewable energy power generator set j participates in the primary frequency regulation or not in the time period k.

$$D_{sys}^{(k)}\Delta f_{ss}^{(k)} = -P_{loss}^{(k)} + \sum_i \Delta P_{gss\_i}^{(k)} + \sum_j \Delta P_{wss\_j}^{(k)} \tag{18}$$

$$\Delta P_{gss\_i}^{(k)} = v_{i,k}^{gen} \min\{-\alpha_i^{gen}\Delta f_{ss}^{(k)}, PR_{i,k}^{gen}\}, \forall i \tag{19}$$

-continued $$\Delta P_{wss\_j}^{(k)} = v_{j,k}^{wind} \min\{-k_j^{droop}\Delta f_{ss}^{(k)}, PR_{j,k}^{wind}\}, \forall j \tag{20}$$

Since the equations (18) to (20) contain non-linear terms that are not beneficial to calculation, the equations may be accurately linearized by introducing continuous auxiliary variables $$s_{i,k}^3, s_{j,k}^4$$

and $$s_{i,k}^5$$

and Boolean auxiliary variables $$q_{i,k}^2 \text{ and } q_{i,k}^3$$

$\in \{0, 1\}$. Specifically, the equations (18) to (20) are equivalent to the mixed integer linear constraint expressions (21) to (31).

$$-\alpha_i^{gen}\Delta f_{ss}^{(k)} - Mq_{i,k}^2 \le s_{i,k}^3 \le -\alpha_i^{gen}\Delta f_{ss}^{(k)}, \forall i \tag{21}$$

$$PR_{i,k}^{gen} - M(1 - q_{i,k}^2) \le s_{i,k}^3 \le PR_{i,k}^{gen}, \forall i \tag{22}$$

$$-k_j^{droop}\Delta f_{ss}^{(k)} - Mq_{j,k}^3 \le s_{j,k}^4 \le PR_{i,k}^{gen}, \forall i \tag{23}$$

$$PR_{j,k}^{wind} - M(1 - q_{j,k}^3) \le s_{j,k}^4 \le -k_j^{droop}\Delta f_{ss}^{(k)}, \forall j \tag{24}$$

$$-Mv_{i,k}^{gen} \le \Delta P_{gss\_i}^{(k)} \le s_{i,k}^3 + M(1 - v_{i,k}^{gen}), \forall i \tag{25}$$

$$s_{i,k}^3 - M(1 - v_{i,k}^{gen}) \le \Delta P_{gss\_i}^{(k)} \le Mv_{i,k}^{gen}, \forall i \tag{26}$$

$$-Mv_{j,k}^{wind} \le \Delta P_{wss\_j}^{(k)} \le s_{j,k}^4 + M(1 - v_{j,k}^{wind}), \forall j \tag{27}$$

$$s_{j,k}^4 - M(1 - v_{j,k}^{wind}) \le \Delta P_{wss\_j}^{(k)} \le Mv_{j,k}^{wind}, \forall j \tag{28}$$

$$-Mv_{i,k}^{gen} \le s_{i,k}^5 \le \Delta f_{ss}^{(k)} + M(1 - v_{i,k}^{gen}), \forall i \tag{29}$$

$$\Delta f_{ss}^{(k)} - M(1 - v_{i,k}^{gen}) \le s_{i,k}^5 \le Mv_{i,k}^{gen}, \forall i \tag{30}$$

$$\sum_i d_i^{gen} s_{i,k}^5 = -P_{loss}^{(k)} + \sum_i \Delta P_{gss\_i}^{(k)} + \sum_j \Delta P_{wss\_j}^{(k)} \tag{31}$$

The steady-state power deviation $$\Delta P_{gss\_i}^{(k)}$$

of the conventional energy power generator set, the steady-state power deviation $$\Delta P_{wss\_j}^{(k)}$$

of the renewable energy power generator set, and the absolute value of the steady-state frequency deviation $$\Delta f_{ss}^{(k)}$$

of the power system are calculated by equations (18) to (20) according to the equivalent damping coefficient $$D_{sys}^{(k)}$$

the largest imbalanced power $$P_{loss}^{(k)}$$

of the power system, the parameters of the conventional energy power generator set, and the parameters of the renewable energy power generator set in the preset time period k.

At step S503, a maximum frequency deviation of the power system is calculated according to the parameters of the conventional energy power generator set, the parameters of the renewable energy power generator set, and the largest imbalanced power combining with a preset piecewise linear function.

The parameters of the conventional energy power generator set and the parameters of the renewable energy power generator set in the preset time period k include: an equivalent inertia time constant $$H_{sys}^{(k)}$$

an equivalent damping coefficient $$D_{sys}^{(k)}$$

a virtual inertia time constant $$k_j^{inertia}$$

of the renewable energy power generator set j, a Boolean variable $$v_{j,k}^{wind}$$

representing whether the renewable energy power generator set j participates in the primary frequency regulation in the time period k, a time constant $$\tau_i^{gen}$$

a Boolean variable $$v_{i,k}^{gen}$$

representing whether the conventional energy power generator set i participates in the primary frequency regulation or not in the time period k, a coefficient $$\alpha_i^{gen}$$

of the governor, and a droop control coefficient $$k_j^{droop}$$

of the renewable energy power generator set j.

The maximum frequency deviation $$\Delta f_{nadir}^{(k)}$$

of the power system is calculated according to the parameters of the conventional energy power generator set, the parameters of the renewable energy power generator set, and the largest imbalanced power P $$P_{loss}^{(k)}$$

of the power system combining with a preset piecewise linear function (32).

In the above embodiments, the absolute value of the maximum RoCoF of the power system is calculated according to the post-fault instantaneous power change amount the renewable energy power generator set, the equivalent inertia time constant and the largest imbalanced power of the preset time period. The steady-state power deviation of the conventional energy power generator set, the steady-state power deviation of the renewable energy power generator set, and the absolute value of the steady-state frequency deviation of the power system are calculated according to the equivalent damping coefficient, the largest imbalanced power, the parameters of the conventional energy power generator set, and the parameters of the renewable energy power generator set in the preset time period. The maximum frequency deviation of the power system is calculated according to the parameters of the conventional energy power generator set, the parameters of the renewable energy power generator set, and the largest imbalanced power combining with the preset piecewise linear function. By calculating the absolute value of the maximum RoCoF of the power system, the absolute value of the steady-state frequency deviation of the power system, and the maximum frequency deviation of the power system, the post-fault frequency performance of the system may be evaluated more accurately.

Figure 6:
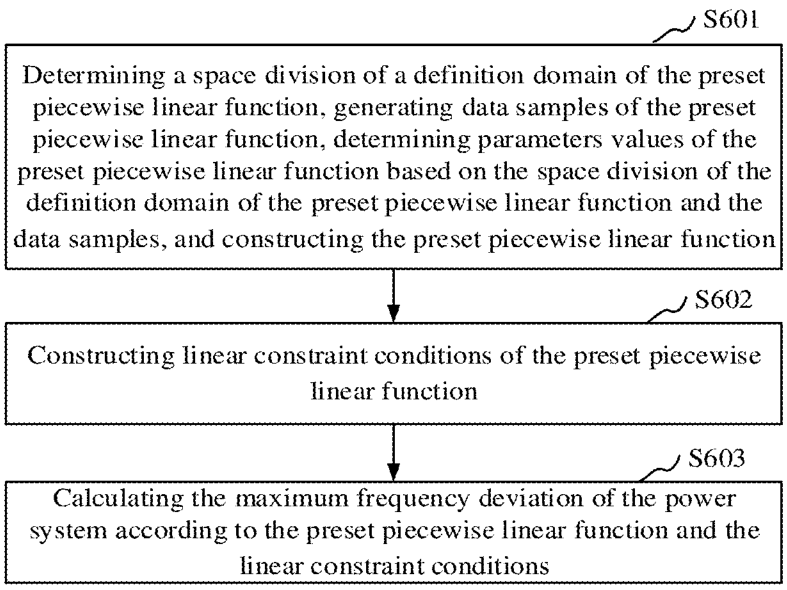
FIG. 6 is a schematic flow diagram of a method of frequency regulation of the power system involving renewable energy power generation in accordance with yet another embodiment.

In an embodiment, as shown in FIG. 6, the step S503 of calculating the maximum frequency deviation of the power system according to the parameters of the conventional energy power generator set, the parameters of the renewable energy power generator set, and the largest imbalanced power combining with the preset piecewise linear function, may include step S601 to step S603.

At step S601, a space division of a definition domain of the preset piecewise linear function is determined, data samples of the preset piecewise linear function are generated, parameters values of the preset piecewise linear function are determined based on the space division of the definition domain of the preset piecewise linear function and the data samples, and the preset piecewise linear function is constructed.

The expression of the preset piecewise linear function is:

$$g^L(M,\tau,\alpha,D)\big|_{(M,\tau,\alpha,D)\in H_s}=\kappa_s^C+\kappa_s^M M+\kappa_s^D D+\kappa_s^\tau\tau+\kappa_s^\alpha\alpha \tag{32}$$

The data samples of the preset piecewise linear function need to be determined during construction of the preset piecewise linear function. Specifically, first O samples $v_o((v_o)^T=(\mu_o)^T)^T$ are randomly generated in a space $\{0,1\}^{n_G+n^W}$, where $v_o=\mathrm{col}(v_{o,j})\in\{0,1\}^{n_G}$ represents the first $n_G$ elements in the samples $v_o$, and $\mu_o=\mathrm{col}(\mu_{o,j})\in\{0,1\}^{n_G}$ represents the remaining elements in the samples $v_o$. Then the data samples of the preset piecewise linear function are generated according to equations (33) to (37).

$$M_o=2\sum_i v_{o,i}H_i^{gen}+\sum_j\mu_{o,j}k_j^{inertia} \tag{33}$$

$$\tau_o=\sum_i(v_{o,i}\tau_i^{gen})/\sum_k v_{o,j} \tag{34}$$

$$\alpha_o=\sum_i v_{o,i}\alpha_i^{gen} \tag{35}$$

$$D_o=\sum_i v_{o,i}d_i^{gen}+\sum_j\mu_{o,j}k_j^{droop} \tag{36}$$

$$g_o=g(M_o,\tau_o,\alpha_o,D_o) \tag{37}$$

The non-linear function g(M, τ, α, D) is determined jointly by equations (38).

$$\begin{cases} g(M,\tau,\alpha,D)=\dfrac{-1}{D+\alpha}\left[1+\sqrt{\dfrac{\omega_d^2+(\gamma-\eta)^2}{\eta^2+\omega_d^2}}\times e^{-\eta t_{nadir}}\right]\\ t_{nadir}=\dfrac{\pi+\varphi-\tan^{-1}(\eta/\omega_d)}{\omega_d}\\ \eta=\dfrac{1}{2}\left(\dfrac{1}{\tau}+\dfrac{D}{M}\right)\\ \omega_d=\sqrt{\dfrac{D+\alpha}{\tau M}-\eta^2}\\ \gamma=\dfrac{1}{\tau}-\dfrac{\alpha}{M}\\ \alpha=\sqrt{1+(\gamma-\eta)^2/\omega_d^2}\\ \tan\varphi=(\gamma-\eta)/\omega_d,\ \varphi\in(-\pi/2,\pi/2) \end{cases} \tag{38}$$

The space division of the definition domain of the preset piecewise linear function needs to be determined during construction of the preset piecewise linear function. Specifically, the parameter space (M, τ, α, D) is divided into several sub-spaces, and the s-th sub-space is denoted as $H_s$, which is:

$$H_s=\left\{(M,\tau,\alpha,D)\,\middle|\,\begin{matrix}\underline{M}_s\le M\le\overline{M}_s\\ \underline{\tau}_s\le\tau\le\overline{\tau}_s\\ \underline{\alpha}_s\le\alpha\le\overline{\alpha}_s\\ \underline{D}_s\le D\le\overline{D}_s\end{matrix}\right\} \tag{39}$$

S denotes a group of spatial indexes s, the parameter values of the preset piecewise linear function corresponding to the sub-space $H_s$ is denoted by $$\{\kappa_s^C,\kappa_s^M,\kappa_s^D,\kappa_s^\tau,\kappa_s^\alpha\}$$

and $$\{\kappa_s^C,\kappa_s^M,\kappa_s^D,\kappa_s^\tau,\kappa_s^\alpha\}$$

is determined by the optimal solution of the optimization problem (40).

$$\min_{\kappa_s^C,\kappa_s^M,\kappa_s^D,\kappa_s^\tau,\kappa_s^\alpha}\sum_{o:(M_o,\tau_o,\alpha_o,D_o)\in H_s}\left|\frac{Err_o}{g_o}\right| \tag{40}$$

$$\text{s.t.}$$

$$\forall o:(M_o,\tau_o,\alpha_o,D_o)\in H_s$$

$$Err_o=\kappa_s^C+\kappa_s^M M_o+\kappa_s^D D_o+\kappa_s^\tau\tau_o+\kappa_s^\alpha\alpha_o-g_o$$

The space division of the definition domain of the preset piecewise linear function is determined, and the data samples of the preset piecewise linear function is generated, and the parameter values of the preset piecewise linear function are determined based on the space division of the definition domain of the preset piecewise linear function and the data samples, and the preset piecewise linear function is constructed.

At step S602, linear constraint conditions of the preset piecewise linear function are constructed.

The linear constraint conditions are expressed as:

$$\frac{v_{i,k}^{gen}k_i^{gen}\left(P_{loss}^{(k)}+D_{asfr}^{(k)}\Delta f_{nadir}^{(k)}\right)}{\sum_{i'\in N_G}v_{i',k}^{gen}k_{i'}^{gen}}\le PR_{i,k}^{gen},\ \forall i \tag{41}$$

$$v_{j,k}^{wind}\left(\frac{c_j^I k_j^{inertia}P_{loss}^{(k)}}{M_{asfr}^{(k)}}-c_j^{||}k_j^{droop}\Delta f_{nadir}^{(k)}\right)\le PR_{j,k}^{wind},\ \forall j \tag{42}$$

where $$c_j^I\ \text{and}\ c_j^{||}$$

are approximate parameters of the renewable energy power generator set j, and are empirically determined by the parameter $s_j$ in the following way: if $0\le s_j<0.2$, then $$c_j^I=1,\ c_j^{||}=0$$

and if $0.2 \le s_j < 0.4$, then $c_j^I = 0.9245$, $c_j^{II} = 0.2162$, and if $0.4 \le s_j < 1.6$, then $c_j^I = 0.5001$, $c_j^{II} = 0.8135$, and if $1.6 \le s_j < \infty$, then $c_j^I = 0$, $c_j^{II} = 1$. Where $k_i^{gen} = \alpha_i^{gen}/\tau_i^{gen}$ represents a ratio of the coefficient of the governor to the time constant. Since the expressions (41) and (42) contain non-linear terms that are not beneficial to calculation, the expressions may be accurately linearized by introducing continuous auxiliary variables $$s_k^{11},\ s_{i,k}^{12},\ s_{i,k}^{13},\ s_{j,k}^{14},\ s_k^{15},\ s_{i,k}^{16},\ S_{j,k}^{17},\text{ and } s_{j,k}^{18}.$$

Specifically, expression (41) is equivalent to the mixed integer linear constraint expressions (43) to (50).

$$-Mv_{i,k}^{gen} \le s_{i,k}^{12} \le s_k^{11} + M\left(1 - v_{i,k}^{gen}\right) \tag{43}$$

$$s_k^{11} - M\left(1 - v_{i,k}^{gen}\right) \le s_{i,k}^{12} \le Mv_{i,k}^{gen} \tag{44}$$

$$-Mv_{i,k}^{gen} \le s_{i,k}^{13} \le \Delta f_{nadir}^{(k)} + M\left(1 - v_{i,k}^{gen}\right) \tag{45}$$

$$\Delta f_{nadir}^{(k)} - M\left(1 - v_{i,k}^{gen}\right) \le s_{i,k}^{12} \le Mv_{i,k}^{gen} \tag{46}$$

$$-Mv_{j,k}^{wind} \le S_{j,k}^{14} \le \Delta f_{nadir}^{(k)} + M\left(1 - v_{j,k}^{wind}\right) \tag{47}$$

$$\Delta f_{nadir}^{(k)} - M\left(1 - v_{j,k}^{wind}\right) \le s_{j,k}^{14} \le Mv_{j,k}^{wind} \tag{48}$$

$$\sum_i k_i^{gen} s_{i,k}^{12} = \Delta P_{loss}^{(k)} + \sum_i D_i^{gen} s_{i,k}^{13} + \sum_j k_j^{droop} s_{j,k}^{14} \tag{49}$$

$$k_i^{gen} s_{i,k}^{12} \le PR_{i,k}^{gen},\ \forall\, i \tag{50}$$

Expression (42) is equivalent to the mixed integer linear constraint expressions (51) to (59):

$$-Mv_{i,k}^{gen} \le s_{i,k}^{16} \le s_k^{15} + M\left(1 - v_{i,k}^{gen}\right) \tag{51}$$

$$s_k^{15} - M\left(1 - v_{i,k}^{gen}\right) \le s_{i,k}^{16} \le Mv_{i,k}^{gen} \tag{52}$$

$$-Mv_{j,k}^{wind} \le s_{j,k}^{17} \le s_k^{15} + M\left(1 - v_{j,k}^{wind}\right) \tag{53}$$

-continued $$s_k^{15} - M\left(1 - v_{j,k}^{wind}\right) \le s_{j,k}^{17} \le Mv_{j,k}^{wind} \tag{54}$$

$$2\sum_i H_i^{gen} s_{i,k}^{16} + \sum_j k_j^{inertia} s_{j,k}^{17} = \Delta P_{loss}^{(k)} \tag{55}$$

$$s_{j,k}^{18} \le c_j^I k_j^{inertia} s_k^{15} - c_j^{II} k_j^{droop} \Delta f_{nadir}^{(k)} + M\left(1 - v_{j,k}^{wind}\right) \tag{56}$$

$$c_j^I k_j^{inertia} s_k^{15} - c_j^{II} k_j^{droop} \Delta f_{nadir}^{(k)} - M\left(1 - v_{j,k}^{wind}\right) \le s_{j,k}^{18} \tag{57}$$

$$-Mv_{j,k}^{wind} \le s_{j,k}^{18} \le Mv_{j,k}^{wind} \tag{58}$$

$$s_{j,k}^{18} \le PR_{j,k}^{wind} \tag{59}$$

The linear constraint conditions (41) and (42) of the preset piecewise linear function is constructed.

At step S603, the maximum frequency deviation of the power system is calculated according to the preset piecewise linear function and the linear constraint conditions.

The maximum frequency deviation of the power system is calculated according to equations (60) to (64):

$$\Delta f_{nadir}^{(k)} = P_{loss}^{(k)} \times g^L\left(M_{asfr}^{(k)},\ \tau_{asfr}^{(k)},\ \alpha_{asfr}^{(k)},\ D_{asfr}^{(k)}\right) \tag{60}$$

$$M_{asfr}^{(k)} = 2H_{sys}^{(k)} + \sum\nolimits_{f} v_{j,k}^{wind} k_j^{inertia} \tag{61}$$

$$\tau_{asfr}^{(k)} = \sum\nolimits_i \left(v_{i,k}^{gen} \tau_i^{gen}\right) / \sum\nolimits_i v_{i,k}^{gen} \tag{62}$$

$$\alpha_{asfr}^{(k)} = \sum\nolimits_i v_{i,k}^{gen} \alpha_i^{gen} \tag{63}$$

$$D_{asfr}^{(k)} = D_{sys}^{(k)} + \sum\nolimits_j v_{j,k}^{wind} k_j^{droop} \tag{64}$$

Since equations (60) to (64), and equation (32) contain non-linear terms that are not beneficial to calculation, these equations may be accurately linearized by introducing continuous auxiliary variables $$s_{s,k,}^7,\ s_{s,k}^8,\ s_{s,k}^9,\ s_{s,k}^{10}$$

and a Boolean auxiliary variable $$q_{s,k}^4$$

$\in \{0, 1\}$. Specifically, the equations (60) to (64), and equation (32) are equivalent to the mixed integer linear constraint expressions (65) to (79).

$$\sum_s \underline{M}_s q_{s,k}^4 \le M_{asfr}^{(k)} \le \sum_s \overline{M}_s q_{s,k}^4 \tag{65}$$

$$\sum_s \underline{\tau}_s q_{s,k}^4 \le \tau_{asfr}^{(k)} \le \sum_s \overline{\tau}_s q_{s,k}^4 \tag{66}$$

$$\sum_s \underline{\alpha}_s q_{s,k}^4 \le \alpha_{asfr}^{(k)} \le \sum_s \overline{\alpha}_s q_{s,k}^4 \tag{67}$$

$$\sum_s \underline{D}_s q_{s,k}^4 \le D_{asfr}^{(k)} \le \sum_s \overline{D}_s q_{s,k}^4 \tag{68}$$

$$\sum_s q_{s,k}^4 = 1 \tag{69}$$

$$-Mq_{s,k}^4 \le s_{s,k}^7 \le M_{asfr}^{(k)} + q_{s,k}^4(1 - M) \tag{70}$$

$$M_{asfr}^{(k)} - M\left(1 - q_{s,k}^4\right) \le s_{s,k}^7 \le Mq_{s,k}^4 \tag{71}$$

-continued $$-Mq_{s,k}^4 \le s_{s,k}^8 \le \tau_{asfr}^{(k)} + q_{s,k}^4(1-M) \quad (72)$$

$$\tau_{asfr}^{(k)} - M(1-q_{s,k}^4) \le s_{s,k}^8 \le Mq_{s,k}^4 \quad (73)$$

$$-Mq_{s,k}^4 \le s_{s,k}^9 \le \alpha_{asfr}^{(k)} + q_{s,k}^4(1-M) \quad (74)$$

$$\alpha_{asfr}^{(k)} - M(1-q_{s,k}^4) \le s_{s,k}^9 \le Mq_{s,k}^4 \quad (75)$$

$$-Mq_{s,k}^4 \le s_{s,k}^{10} \le D_{asfr}^{(k)} + q_{s,k}^4(1-M) \quad (76)$$

$$D_{asfr}^{(k)} - M(1-q_{s,k}^4) \le s_{s,k}^{10} \le Mq_{s,k}^4 \quad (77)$$

$$g_k = \sum_s \left(\kappa_s^C q_{s,k}^4 + \kappa_s^M s_{s,k}^7 + \kappa_s^\tau s_{s,k}^8 + \kappa_s^\alpha s_{s,k}^9 + \kappa_s^D s_{s,k}^{10}\right) \quad (78)$$

$$\Delta f_{nadir}^{(k)} = \Delta P_{loss}^{(k)} g_k \quad (79)$$

The maximum frequency deviation $$\Delta f_{nadir}^{(k)}$$

of the power system is calculated based on equations (60) to (64), according to the expression (32) of the preset piecewise linear function and under the linear constraint expressions (41) and (42).

In the above embodiment, the space division of the definition domain of the preset piecewise linear function is determined, the data samples of the preset piecewise linear function are generated, the parameter values of the preset piecewise linear function are determined based on the space division of the definition domain of the preset piecewise linear function and the data samples, and the preset piecewise linear function is constructed. Since the preset piecewise linear function is rather complex, linear constraint conditions are constructed as approximate conditions of the result namely the maximum frequency deviation $$\Delta f_{nadir}^{(k)}$$

so that explicit equations of the maximum frequency deviation in the way of conditions are obtained, thereby facilitating the evaluation of the frequency of the post-fault power system.

Figure 7:
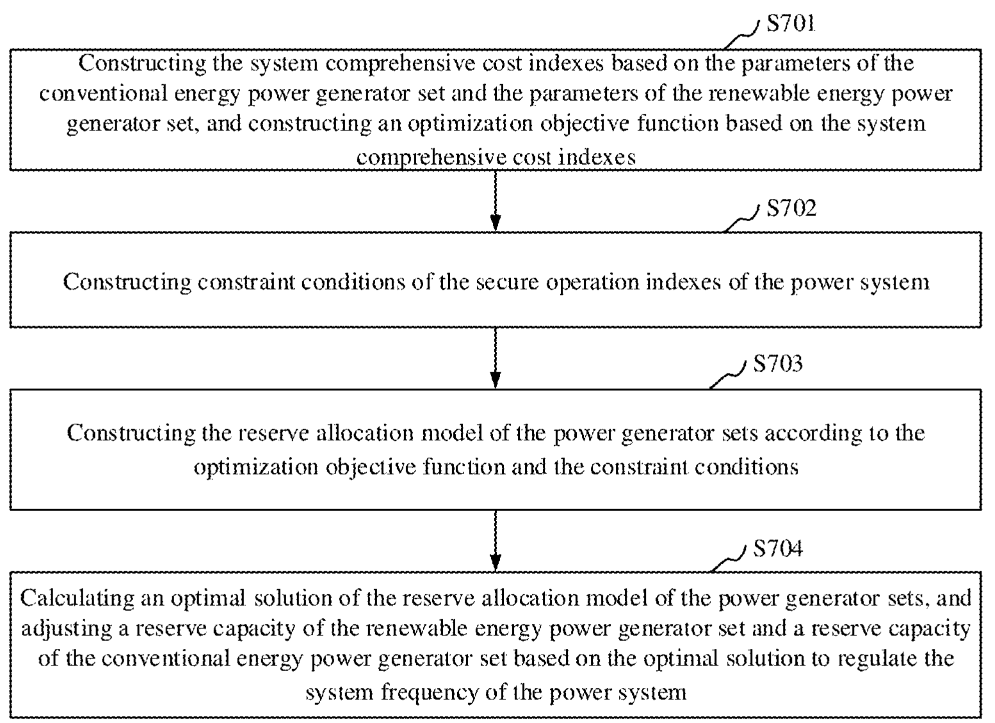
FIG. 7 is a schematic flow diagram of a method of frequency regulation of the power system involving renewable energy power generation in accordance with yet another embodiment.

In an embodiment, as shown in FIG. 7, the step S203 of obtaining the system comprehensive cost indexes of the power system, constructing the reserve allocation model of the power generator sets according to the system comprehensive cost indexes and the secure operation indexes of the power system, and regulating the system frequency of the power system through the reserve allocation model, may include steps S701 to S704.

At step S701, the system comprehensive cost indexes are constructed based on the parameters of the conventional energy power generator set and the parameters of the renewable energy power generator set, and an optimization objective function is constructed based on the system comprehensive cost indexes.

The parameters of the conventional energy power generator set include: a fixed cost coefficient $$C_i^{fixed}$$

of power generation, a start-up cost coefficient $$C_i^{SU}$$

of the generator set, a shutdown cost coefficient $$C_i^{SD}$$

of the generator set, a variable cost coefficient $$C_i^{incr}$$

of power generation, the on/off state $u_{i,k}$ of the conventional energy power generator set i in the time period k, and a Boolean variable $$v_{i,k}^{gen}$$

representing whether the conventional energy power generator set i participates in the primary frequency regulation or not in the time period k.

The parameters of the renewable energy power generator set include: a wind curtailment penalty coefficient $$C_j^{pen}$$

of the renewable energy power generator set j, a predicted value $$P_{j,k}^{mppt}$$

of a maximum power point tracking (MPPT) of the renewable energy power generator set j in the time period k, a Boolean variable $$v_{j,k}^{wind}$$

representing whether the renewable energy power generator set j participates in the primary frequency regulation or not in the time period k.

The system comprehensive cost indexes include a decision variable $u_{i,k}$, which represents the on/off state of the conventional energy power generator set i in the time period k.

$$z_{i,k}^{SU}$$

and $$z_{i,k}^{SD}$$

represent startup and shutdown actions of the conventional energy power generator set i in the time period k, respectively.

$$P_{i,k}^{gen}$$

represents a planned output of the conventional energy power generator set i in the time period k·

$$P_{j,k}^{wind}$$

represents an actual output of the renewable energy power generator set j in the time period k·

$$PR_{i,k}^{gen},\ SR_{i,k}^{gen} \text{ and } TR_{i,k}^{gen}$$

represent the primary frequency-regulation reserve capacity, the secondary frequency-regulation reserve capacity, and the tertiary frequency-regulation reserve capacity of the conventional energy power generator set i in the time period k, respectively.

$$PR_{j,k}^{wind},\ SR_{j,k}^{wind} \text{ and } TR_{j,k}^{wind}$$

represent the primary frequency-regulation regulation reserve capacity, the secondary frequency-regulation reserve capacity, and the tertiary frequency-regulation reserve capacity of the renewable energy power generator set j in the time period k, respectively;

$$z_{i,k}^{gen}$$

represents the post-fault secondary frequency-regulation reserve deployment of the conventional energy power generator set i in the time period k; and $$z_{j,k}^{wind}$$

represents the post-fault secondary frequency-regulation reserve deployment of the renewable energy power generator set j in the time period k.

The optimization objective function is shown in expression (80) and expression (81):

$$\min \sum_k \left( \sum_i \left( C_i^{fixed} u_{i,k} + C_i^{SU} z_{i,k}^{SU} + C_i^{SD} z_{i,k}^{SD} + C_i^{incr} P_{i,k}^{gen} \right) + \right. \tag{80}$$

-continued $$\left. \sum_j C_j^{pen} \left( P_{j,k}^{mppt} - P_{j,k}^{wind} - PR_{j,k}^{wind} - SR_{j,k}^{wind} - TR_{j,k}^{wind} \right) \right)$$

$$\text{over} \left\{ \begin{matrix} u_{i,k},\ z_{i,k}^{SU},\ z_{i,k}^{SD},\ v_{i,k}^{gen},\ v_{j,k}^{wind},\ P_{i,k}^{gen} + P_{j,k}^{wind} + z_{i,k}^{gen},\ z_{j,k}^{wind} \\ PR_{i,k}^{gen},\ PR_{j,k}^{wind},\ SR_{i,k}^{gen},\ SR_{j,k}^{wind},\ TR_{i,k}^{gen},\ TR_{j,k}^{wind} \end{matrix} \right\} \tag{81}$$

The system comprehensive cost indexes are constructed based on the parameters of the conventional energy power generator set and the parameters of the renewable energy power generator set, and the optimization objective function is constructed based on the system comprehensive cost indexes, as shown in expression (80) and expression (81).

At step S702, constraint conditions of the secure operation indexes of the power system are constructed.

A security operation standard of the power system needs to be established for the construction of the constraint conditions. A normal-transmission capacity limit $$\overline{PL_l}$$

and a post-fault-transmission capacity limit $$\overline{PL_l}^{ctgc}$$

of the line l are set, respectively. L denotes a transmission set. B denotes a busbar set. T denotes a scheduling time period set. An allowed maximum RoCoF is set as $\overline{\text{RoCoF}}$. An allowed maximum frequency deviation is set as $\Delta f_{UFLS}$, namely an under frequency load shedding threshold. An allowed maximum steady-state frequency deviation is set as $\overline{\Delta f_{ss}}$. ctgc(k) represents a serial number of a faulty power generator set in the time period k, and $$P_{loss}^{(k)}$$

represents the largest imbalanced power.

At step S703, the reserve allocation model of the power generator sets is constructed according to the optimization objective function and the constraint conditions.

The reserve capacity is a capacity, with which a power generator, after a fault, should be supplemented.

The reserve allocation model of the conventional energy power generator set and the renewable energy power generator set, when the fault occurs to the sets, is constructed according to the optimization objective function of expression (80) and expression (81) and according to the constraint conditions.

At step S704, an optimal solution of the reserve allocation model of the power generator sets is calculated, and a reserve capacity of the renewable energy power generator set and a reserve capacity of the conventional energy power generator set are adjusted based on the optimal solution to regulate the system frequency of the power system.

The optimal solution of the reserve allocation model of the power generator sets is solved by a commercial solver CPLEX, GUROBI, or the like. Since the solution includes the reserve capacities of the conventional energy power generator set and renewable energy power generator set, the current reserve capacities of the renewable energy power generator set and conventional energy power generator set are adjusted based on the solved reserve capacities, thereby achieving the purpose of regulating the system frequency of the power system.

According to an embodiment of the present disclosure, the reserve allocation model of the power generator sets is constructed according to the optimization objective function and the constraint conditions, such that reserve capacities for frequency regulation satisfying the frequency security constraints may be obtained at the cost of comparatively few calculation resources, thus the planning efficiency is high, and the practicability of the engineering is strong. In addition, by calculating the optimal solution of the reserve allocation model of the power generator sets, the security of the post-fault system frequency may be ensured by the minimum frequency regulation reserve capacity, thereby balancing the security and the economy.

Figure 8:
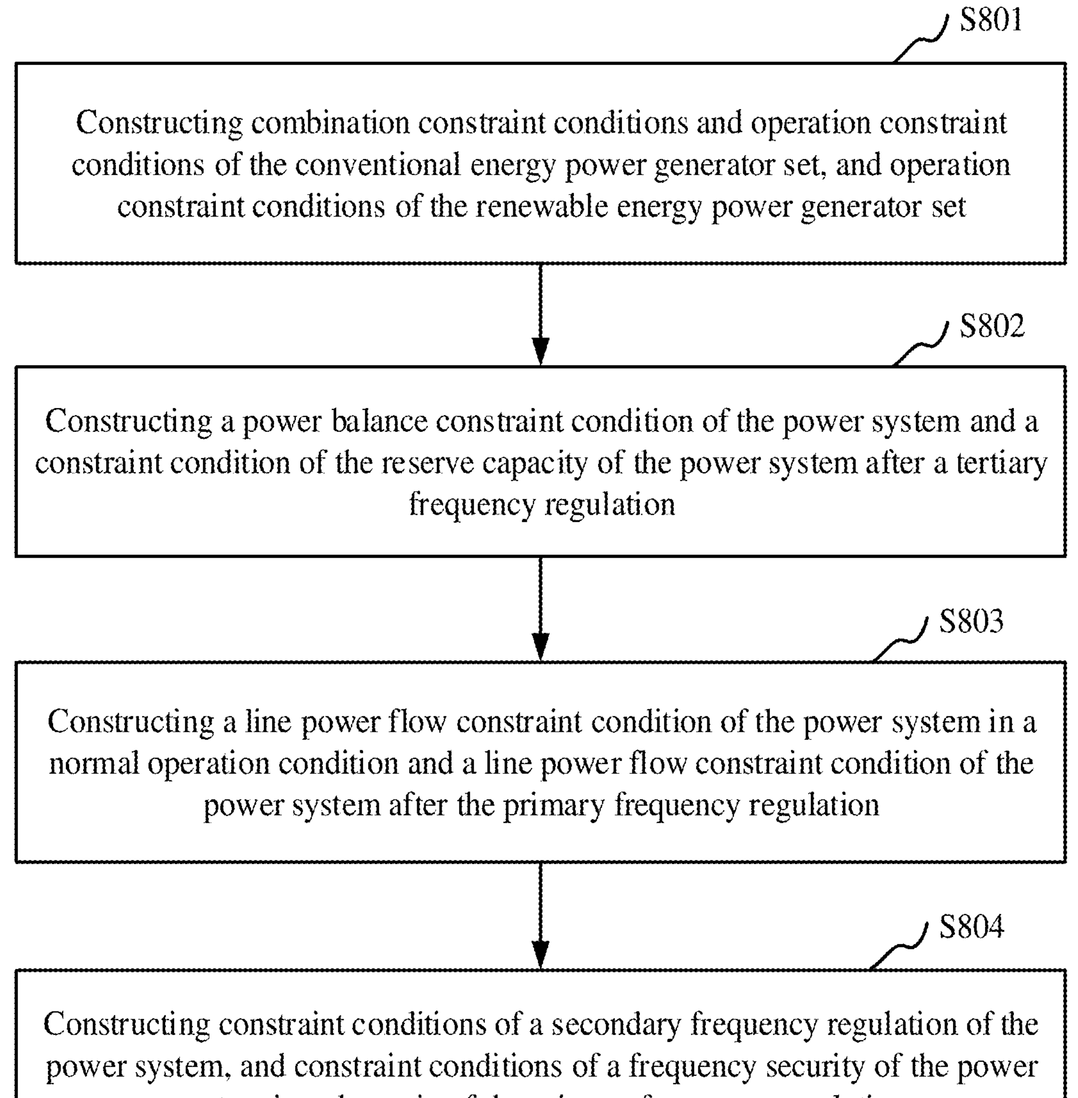
FIG. 8 is a schematic flow diagram of a method of frequency regulation of the power system involving renewable energy power generation in accordance with yet another embodiment.

In an embodiment, as shown in FIG. 8, the above step S702 of constructing the constraint conditions of the secure operation indexes of the power system may include steps S801 to S804.

At step S801, combination constraint conditions and operation constraint conditions of the conventional energy power generator set, and operation constraint conditions of the renewable energy power generator set are constructed.

The combination constraint conditions of the conventional energy power generator set are shown in expressions (82) to (87).

$$u_{i,k}, z_{i,k}^{SU}, z_{i,k}^{SD}, v_{i,k}^{gen} \in \{0,1\} \forall\, i, k \tag{82}$$

$$v_{i,k}^{gen} = \begin{cases} u_{i,k}, \text{ if } i \neq ctgc(k) \\ 0, \text{ if } i = ctgc(k) \end{cases} \forall\, i, k \tag{83}$$

$$z_{i,k}^{SU} + z_{i,k}^{SD} \leq 1 \forall\, i, k \tag{84}$$

$$u_{i,k+1} = u_{i,k} + z_{i,k}^{SU} - z_{i,k}^{SD} \forall\, i, k \tag{85}$$

$$-u_{i,k-1} + u_{i,k} \leq u_{i,k'} \forall\, k \leq k' \leq T_i^{on} + k - 1 \forall\, i \tag{86}$$

$$u_{i,k-1} - u_{i,k} + u_{i,k'} \leq 1 \forall\, k \leq k' \leq T_i^{off} + k - 1 \forall\, i \tag{87}$$

The $u_{i,k}$ represents the on/off state of the conventional energy power generator set i in the time period k·

$$z_{i,k}^{SU} \text{ and } z_{i,k}^{SD}$$

represent startup and shutdown actions of the conventional energy power generator set i in the time period k, respectively. The Boolean variable $$v_{i,k}^{gen}$$

represents whether the conventional energy power generator set i participates in the primary frequency regulation or not in the time period k·ctgc(k) represents the serial number of the faulty power generator set in the time period k·$u_{i,k+1}$ represents an on/off state of the conventional energy power generator set i in the time period k+1·$u_{i,k-1}$ represents an on/off state of the conventional energy power generator set i in the time period k−1·$u_{i,k}$ represents an on/off state of the conventional energy power generator set i in the time period k'·

$$T_i^{on}$$

represents a minimum startup time.

$$T_i^{off}$$

represents a minimum shutdown time.

The operation constraint conditions of the conventional energy power generator set are shown in expressions (88) to (95).

$$P_{i,k}^{gen} + PR_{i,k}^{gen} + SR_{i,k}^{gen} + TR_{i,k}^{gen} \leq u_{i,k} k \overline{P}_i^{gen} \forall\, i, k \tag{88}$$

$$u_{i,k} \underline{P}_i^{gen} \leq P_{i,k}^{gen} \leq u_{i,k} \overline{P}_i^{gen} \forall\, i, k \tag{89}$$

$$u_{i,k} \underline{P}_i^{gen} \leq P_{i,k}^{gen} - TR_{i,k}^{gen} \forall\, i, k \tag{90}$$

$$0 \leq PR_{i,k}^{gen} \leq v_{i,k}^{gen} \overline{P}_i^{gen} \forall\, i, k \tag{91}$$

$$0 \leq SR_{i,k}^{gen} \leq RR_i^{SFR} \times 10 \forall\, i, k \tag{92}$$

$$0 \leq TR_k^{gen} \leq \min\{RR_i^{UP},\ RR_i^{DW}\} \forall\, i, k \tag{93}$$

$$P_{i,k+1}^{gen} - P_{i,k}^{gen} \leq u_{i,k} RR_i^{UP} + (1 - u_{i,k}) RR_i^{SU} \forall\, i, k \tag{94}$$

$$P_{i,k-1}^{gen} - P_{i,k}^{gen} \leq u_{i,k} RR_i^{DW} + (1 - u_{i,k}) RR_i^{SD} \forall\, i, k \tag{95}$$

$$P_{i,k}^{gen}$$

represents a planned output of the conventional energy power generator set i in the time period k·

$$PR_{i,k}^{gen}$$

represents the primary frequency-regulation reserve capacity of the conventional energy power generator set i in the time period k·

$$SR_{i,k}^{gen}$$

represents the secondary frequency-regulation reserve capacity of the conventional energy power generator set i in the time period k·

$$TR_{i,k}^{gen}$$

represents the tertiary frequency-regulation reserve capacity of the conventional energy power generator set i in the time period k·$u_{i,k}$ represents the on/off state of the conventional energy power generator set i in the time period k·

$$\overline{P}_i^{gen}$$

represents an upper limit of the output of the conventional energy power generator set i in the time period k·

$$\underline{P}_i^{gen}$$

represents a lower limit of the output of the conventional energy power generator set i in the time period k. The Boolean variable $$v_{i,k}^{gen}$$

represents whether the conventional energy power generator set i participates in the primary frequency regulation or not in the time period $$k \cdot RR_i^{SFR}$$

represents a ramp speed of the response of the secondary frequency regulation.

$$RR_i^{UP}$$

represents a limit of an upward ramp speed.

$$RR_i^{DW}$$

represents a limit of a downward ramp speed.

$$P_{i,k+1}^{gen}$$

represents a planned output of the conventional energy power generator set i in the time period k−1·

$$RR_i^{SU}$$

represents a start-up ramping limit.

$$RR_i^{SD}$$

represents a shutdown ramping limit.

$$P_{i,k-1}^{gen}$$

represents a planned output of the conventional energy power generator set i in the time period k−1.

The operation constraint conditions of the renewable energy power generator set are shown in expressions (96) to (100):

$$v_{j,k}^{wind} \in \{0, 1\} \forall\ j, k \tag{96}$$

$$P_{j,k}^{wind} + PR_{j,k}^{wind} + SR_{j,k}^{wind} + TR_{j,k}^{wind} \leq P_{j,k}^{mppt} \forall\ j, k \tag{97}$$

$$0 \leq P_{j,k}^{wind}, SR_{j,k}^{wind}, TR_{j,k}^{wind} \forall\ j, k \tag{98}$$

$$0 \leq P_{j,k}^{wind} - TR_{j,k}^{wind} \forall\ j, k \tag{99}$$

$$0 \leq PR_{j,k}^{wind} \leq v_{j,k}^{wind} P_{j,k}^{mppt} \forall\ j, k \tag{100}$$

The Boolean variable $$v_{j,k}^{wind}$$

represents whether the conventional energy power generator set j participates in the primary frequency regulation or not in the time period k·

$$P_{j,k}^{wind}$$

represents an actual output of the renewable energy power generator set j in the time period k·

$$PR_{j,k}^{wind}$$

represents the primary frequency-regulation reserve capacity of the renewable energy power generator set j in the time period k·

$$SR_{j,k}^{wind}$$

represents the secondary frequency-regulation reserve capacity of the renewable energy power generator set j in the time period k·

$$TR_{j,k}^{wind}$$

represents the tertiary frequency-regulation reserve capacity of the renewable energy power generator set j in the time period k·

$$P_{j,k}^{mppt}$$

represents a predicted value of maximum power point tracking of the renewable energy power generator set j in the time period k.

At step S802, a power balance constraint condition of the power system and a constraint condition of the reserve capacity of the power system after a tertiary frequency regulation are constructed.

The power balance constraint condition of the power system is shown in expression (101).

$$\sum_i P_{i,k}^{gen} + \sum_j P_{j,k}^{wind} = \sum_d P_{d,k}^{load} \forall k \quad (101)$$

$$P_{i,k}^{gen}$$

represents the planned output of the conventional energy power generator set i in the time period k·

$$P_{j,k}^{wind}$$

represents an actual output of the renewable energy power generator set j in the time period k·

$$P_{d,k}^{load}$$

represents a predicted value of a load d in the time period k.

The above expression (101) shows that a sum of the planned outputs of all conventional energy power generators and all renewable energy power generators in the time period k is equal to a sum of the predicted values of all loads in the time period k.

The constraint condition of the reserve capacity the power system after the tertiary frequency regulation is shown in expression (102). The tertiary frequency regulation aims at coordinating the economic allocation of the loads, which changes slowly and regularly, among the power plants, so as to realize the economic and stable operation of the power system.

$$\sum_i TR_{i,k}^{gen} + \sum_j TR_{j,k}^{wind} = 5\% \sum_d P_{d,k}^{load} \forall k \quad (102)$$

$$TR_{i,k}^{gen}$$

represents the tertiary frequency-regulation reserve capacity of the conventional energy power generator set i in the time period k·

$$TR_{j,k}^{wind}$$

represents the tertiary frequency-regulation reserve capacity of the renewable energy power generator set j in the time period k.

$$P_{d,k}^{load}$$

represents the predicted value of the load d in the time period k.

The above expression (102) shows that the sum of the tertiary frequency-regulation reserve capacities of all conventional energy power generator sets and all renewable energy power generator sets in the time period k is equal to 5% of the sum of the predicted values of all loads in the time period k.

At step S803, a line power flow constraint condition of the power system in a normal operation condition and a line power flow constraint condition of the power system after the primary frequency regulation are constructed.

The line power flow constraint condition of the power system in the normal operation condition is shown in expression (103).

$$\left| \sum_i SF_{l,i}^{gen} P_{i,k}^{gen} + \sum_j SF_{l,j}^{wind} P_{j,k}^{wind} - \sum_d SF_{l,d}^{load} P_{d,k}^{load} \right| \le \overline{PL}_l^{ctgc} \forall l, k \quad (103)$$

$$SF_{l,i}^{gen}$$

represents a power generation shift factor of the conventional energy power generator set i to the line l·

$$P_{i,k}^{gen}$$

represents the planned output of the conventional energy power generator set i in the time period k·

$$P_{j,k}^{wind}$$

represents the actual output of the renewable energy power generator set j in the time period k·

$$SF_{l,j}^{wind}$$

represents a power generation shift factor of the renewable energy power generator set j to the line l $$SF_{l,d}^{load}$$

represents a power generation shift factor of the load d to the line l·

$$P_{d,k}^{load}$$

represents the predicted value of the load d in the time period k·

$$\overline{PL}_l^{ctgc}$$

represents the limit of the transmission capacity of the line l after the fault occurs.

The line power flow constraint condition of the power system after the primary frequency regulation is shown in expression (104).

$$\left| \begin{array}{c} \sum_{i \neq ctgc(k)} SF_{l,j}^{gen}\left(P_{i,k}^{gen} + \Delta P_{gss\_i}^{(k)}\right) + \\ \sum_j SF_{l,j}^{wind}\left(P_{j,k}^{wind} + \Delta P_{wss\_j}^{(k)}\right) - \sum_d SF_{l,d}^{load} P_{d,k}^{load} \end{array} \right| \le \overline{PL}_l^{ctgc} \forall\, l, k \quad (104)$$

$$SF_{l,i}^{gen}$$

represents a power generation shift factor of the conventional energy power generator set i to the line l;

$$SF_{l,j}^{wind}$$

represents a power generation shift factor of the renewable energy power generator set j to the line l; ctgc(k) represents the serial number of the faulty power generator set in the time period k;

$$P_{i,k}^{gen}$$

represents the planned output of the conventional energy power generator set i in the time period k;

$$P_{j,k}^{wind}$$

represents the planned output of the renewable energy power generator set j in the time period k;

$$\Delta P_{gss\_i}^{(k)}$$

represents the steady-state power deviation in the primary frequency regulation of the conventional energy power generator set i after the fault occurs in the time period k;

$$\Delta P_{wss\_j}^{(k)}$$

represents a steady-state power deviation in the primary frequency regulation of the renewable energy power generator set j after the fault occurs in the time period k;

$$SF_{l,d}^{load}$$

represents a power generation shift factor of the load d to the line l;

$$P_{d,k}^{load}$$

represents a predicted value of the load d in the time period k, $N_D$ denotes a load set; and $$\overline{PL}_l^{ctgc}$$

represents the limit of the transmission capacity of the line l after a fault occurs.

At step S804, constraint conditions of a secondary frequency regulation of the power system, and constraint conditions of a frequency security of the power system in the dynamic of the primary frequency regulation are constructed.

The primary frequency regulation refers to an automatic control process, in which, once the frequency of the power system deviates from a rated value, the control system of the power generator sets in the power system automatically controls the increase/decrease of the active power of the power generator sets, restricts the change of the frequency of the power system, and maintains the security of the frequency of the power system. The secondary frequency regulation refers to regulating the load of the sets artificially according to the frequency of the power system.

The constraint conditions of the secondary frequency regulation of the power system are shown in expressions (105) to (108).

$$0 \le z_{i,k}^{gen} \le SR_{i,k}^{gen} \forall\, i, k \quad (105)$$

$$0 \le z_{j,k}^{wind} \le SR_{j,k}^{wind} \forall\, j, k \quad (106)$$

$$\sum_i \left(z_{i,k}^{gen} + \Delta P_{gss\_i}^{(k)}\right) + \sum_j \left(z_{j,k}^{wind} + \Delta P_{wss\_j}^{(k)}\right) = P_{loss}^{(k)} \forall\, k \quad (107)$$

$$\left| \begin{array}{c} \sum_{i \neq ctgc(k)} SF_{l,i}^{gen}\left(P_{i,k}^{gen} + \Delta P_{gss\_i}^{(k)} + z_{i,k}^{gen}\right) + \\ \sum_j SF_{l,j}^{wind}\left(P_{j,k}^{wind} + \Delta P_{wss\_j}^{(k)} + z_{j,k}^{wind}\right) - \sum_d SF_{l,d}^{load} P_{d,k}^{load} \end{array} \right| \le \overline{PL}_l^{ctgc} \forall\, l, k \quad (108)$$

The constraint conditions of the frequency security of the power system in the dynamic of the primary frequency regulation are shown in equations (109) to (111).

$$RoCoF_{max}^{(k)} \leq \overline{RoCoF}, \forall k \quad (109)$$

$$-\Delta f_{ss}^{(k)} \leq \overline{\Delta f_{ss}}, \forall k \quad (110)$$

$$-\Delta f_{nadir}^{(k)} \leq \Delta f_{UFLS}, \forall k \quad (111)$$

The allowed maximum RoCoF is set as $$\overline{RoCoF}.$$

The allowed maximum frequency deviation is set as $\Delta f_{UFLS}$, namely an under frequency load shedding threshold. The allowed maximum steady-state frequency deviation is set as $$\overline{\Delta f_{ss}}.$$

In the above embodiment, by constructing the constraint conditions of the secure operation indexes of the power system, the reserve allocation model of the power generator sets is more accurate, thereby reducing the frequency fluctuation of the power system after the fault occurs.

In an embodiment, as shown in FIG. 9, the present disclosure provides a process of frequency regulation of a power system involving renewable energy power generation, and the process includes the following steps S901 to S909.

At step S901, the largest imbalanced power, the parameters of the conventional energy power generator set, and the parameters of the renewable energy power generator set are obtained.

The largest imbalanced power $$P_{loss}^{(k)}$$

of the power system, the parameters of the conventional energy power generator set, and the parameters of the renewable energy power generator set are obtained.

At step S902, the system frequency dynamic model of the power system during the power generation is constructed according to the largest imbalanced power, the parameters of the conventional energy power generator set, and the parameters of the renewable energy power generator set.

The equivalent inertia time constant and the equivalent damping coefficient in the preset time period are obtained according to the parameters of the conventional energy power generator set and the parameters of the renewable energy power generator set, and the system frequency dynamic model of the power system during the power generation is constructed according to the equivalent inertia time constant, the equivalent damping coefficient, the largest imbalanced power, the parameters of the conventional energy power generator set, and the parameters of the renewable energy power generator set.

At step S903, an absolute value of a maximum RoCoF of the power system is calculated according to an instantaneous power change amount after a fault of the renewable energy power generator set occurs in a preset time period, an equivalent inertia time constant of the preset time period, and a largest imbalanced power.

The absolute value of the maximum RoCoF of the power system $$RoCoF_{max}^{(k)}$$

is obtained by substituting the post-fault instantaneous power change amount $$\Delta P_{wini\_j}^{(k)}$$

of the renewable energy power generator set in the preset time period, and the equivalent inertia time constant $$H_{sys}^{(k)}$$

and the largest imbalanced power $$P_{loss}^{(k)}$$

of the power system in the preset time period into the expression (8).

At step S904, a steady-state power deviation of the conventional energy power generator set, a steady-state power deviation of the renewable energy power generator set, and an absolute value of a steady-state frequency deviation of the power system are calculated according to the equivalent damping coefficient, the largest imbalanced power, the parameters of the conventional energy power generator set, and the parameters of the renewable energy power generator set in the preset time period.

The steady-state power deviation $$\Delta P_{gss\_i}^{(k)}$$

of the conventional energy power generator set, the steady-state power deviation $$\Delta P_{wss\_j}^{(k)}$$

of the renewable energy power generator set, and the absolute value of the steady-state frequency deviation $$\Delta f_{ss}^{(k)}$$

of the power system are calculated by equations (18) to (20) according to the equivalent damping coefficient $$D_{sys}^{(k)},$$

the largest imbalanced power $$P_{loss}^{(k)}$$

of the power system, the parameters of the conventional energy power generator set, and the parameters of the renewable energy power generator set in the preset time period k.

At step S905, the maximum frequency deviation of the power system is calculated according to the parameters of the conventional energy power generator set, the parameters of the renewable energy power generator set, and the largest imbalanced power combining with a preset piecewise linear function.

The space division of a definition domain of the preset piecewise linear function is determined, data samples of the preset piecewise linear function are generated, parameters values of the preset piecewise linear function are determined based on the space division of the definition domain of the preset piecewise linear function and the data samples, and the preset piecewise linear function is constructed. Linear constraint conditions of the preset piecewise linear function are constructed. The maximum frequency deviation of the power system is calculated according to the preset piecewise linear function and the linear constraint conditions.

At step S906, the system comprehensive cost indexes are constructed based on the parameters of the conventional energy power generator set and the parameters of the renewable energy power generator set, and an optimization objective function is constructed based on the system comprehensive cost indexes.

The system comprehensive cost indexes are constructed based on the parameters of the conventional energy power generator set and the parameters of the renewable energy power generator set, and the optimization objective function is constructed based on the system comprehensive cost indexes, as shown in expression (80) and expression (81).

At step S907, constraint conditions of the secure operation indexes of the power system are constructed.

Operation constraint conditions of the conventional energy power generator set, and operation constraint conditions of the renewable energy power generator set are constructed. A power balance constraint condition of the power system and a constraint condition of the reserve capacity of the power system after the tertiary frequency regulation are constructed. A line power flow constraint condition of the power system in a normal operation condition and a line power flow constraint condition of the power system after the primary frequency regulation are constructed. The constraint conditions of a secondary frequency regulation of the power system, and constraint conditions of a frequency security of the power system in a dynamic of the primary frequency regulation are constructed.

At step S908, the reserve allocation model of the power generator sets is constructed according to the optimization objective function and the constraint conditions. The reserve capacity is a capacity, with which a power generator, after a fault, should be supplemented.

The reserve allocation model of the conventional energy power generator set and the renewable energy power generator set, when the fault occurs to the sets, is constructed according to the optimization objective function of expression (80) and expression (81) and according to the constraint conditions.

At step S909, an optimal solution of the reserve allocation model of the power generator sets is calculated, and a reserve capacity of the renewable energy power generator set and conventional energy power generator set is adjusted based on the optimal solution, so as to regulate the system frequency of the power system.

The optimal solution of the reserve allocation model of the power generator sets is solved by a commercial solver CPLEX, GUROBI, or the like. Since the solution includes the reserve capacities of the conventional energy power generator set and renewable energy power generator set, the current reserve capacities of the renewable energy power generator set and conventional energy power generator set are adjusted based on the solved reserve capacities, thereby achieving the purpose of regulating the system frequency of the power system.

In the above embodiment, the largest imbalanced power, the parameters of the conventional energy power generator set, and the parameters of the renewable energy power generator set are obtained. The system frequency dynamic model of the power system during the power generation is constructed according to the largest imbalanced power, the parameters of the conventional energy power generator set, and the parameters of the renewable energy power generator set. The absolute value of the maximum RoCoF of the power system is calculated according to the instantaneous power change amount after the fault of the renewable energy power generator set occurs in the preset time period, the equivalent inertia time constant of the preset time period, and the largest imbalanced power. The steady-state power deviation of the conventional energy power generator set, the steady-state power deviation of the renewable energy power generator set, and the absolute value of the steady-state frequency deviation of the power system are calculated according to the equivalent damping coefficient, the largest imbalanced power, the parameters of the conventional energy power generator set, and the parameters of the renewable energy power generator set in the preset time period. The maximum frequency deviation of the power system is calculated according to the parameters of the conventional energy power generator set, the parameters of the renewable energy power generator set, and the largest imbalanced power combining with a preset piecewise linear function. The system comprehensive cost indexes are constructed based on the parameters of the conventional energy power generator set and the parameters of the renewable energy power generator set, and the optimization objective function is constructed based on the system comprehensive cost indexes. The constraint conditions of the secure operation indexes of the power system are constructed. The reserve allocation model of the power generator sets is constructed according to the optimization objective function and the constraint conditions. The optimal solution of the reserve allocation model of the power generator sets is calculated, and the reserve capacity of the renewable energy power generator set and conventional energy power generator set is adjusted based on the optimal solution, so as to regulate the system frequency of the power system. The embodiments of the present disclosure provide a basis for analyzing the post-fault frequency performance of the power system by constructing the accurate post-fault system frequency dynamic model specially including the primary frequency regulation response and the non-linear amplitude limiting for the conventional energy power generator set and the renewable energy power generator set. Further, by calculating the absolute value of the maximum RoCoF of the power system, the absolute value of the steady-state frequency deviation and the maximum frequency deviation of the power system, the accuracy of evaluation of the post-fault frequency performance of the power system is improved, and a strong adaptability for the power system with a high proportion of renewable energy is achieved. Finally, the reserve allocation model of the power generator sets is constructed, which may ensure the security of the system frequency after the fault at the cost of the minimum frequency-regulation reserve capacity, thereby balancing the security and the economy.

The effects of the present disclosure are illustrated hereinafter by combining with a specific embodiment.

Figure 10:
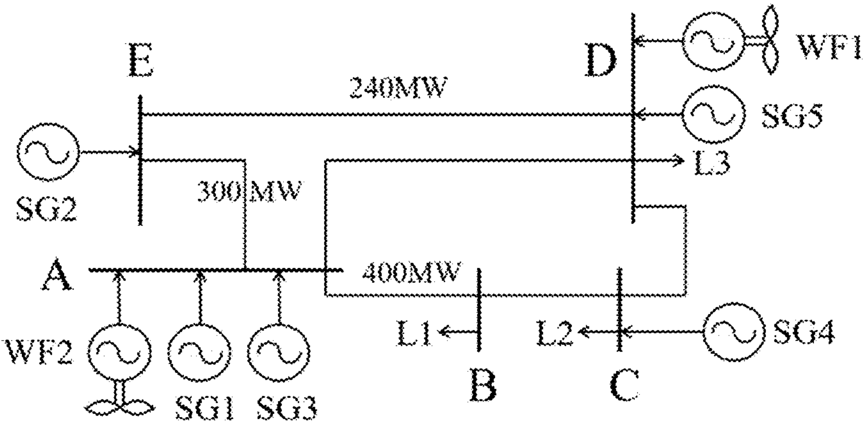
FIG. 10 is a schematic diagram showing a modified IEEE5 power-saving system in accordance with an embodiment.

The present embodiment refers to a modified IEEE 5 nodes system having a topology as shown in FIG. 10 and including five conventional energy power generator sets SG1 to SG5, two wind farms WF1 and WF2 of 200 MW, and three loads L1 to L3.

The parameters of the conventional energy power generator sets are shown in Table 1.

The control parameters of the primary frequency regulation of the wind farm WF1 are $$k_1^{inertia} = 10,\ k_1^{droop} = 20$$

(p.u.), and the control parameters of the primary frequency regulation of the wind farm WF2 is $$k_2^{inertia} = 10,\ k_2^{droop} = 0(p.u.).$$

The upper limits of active power transmission of the transmission lines (A, E), (A, B), and (D, E) under a normal condition and after a fault of the power generator sets are shown in FIG. 10. It is assumed that the conventional energy power generator set SG1 is the largest single base-load generator set and always operates in a full-load state, and in this embodiment, a burst fault occurs to the conventional energy power generator set SG1. The frequency security index requirements are set as follows:

$$\overline{RoCoF} = 0.0048(p.u.),\ \Delta f_{LFLS} = 0.008(p.u.),\text{ and }\overline{\Delta f_{ss}} = 0.004(p.u.).$$

Figure 11:
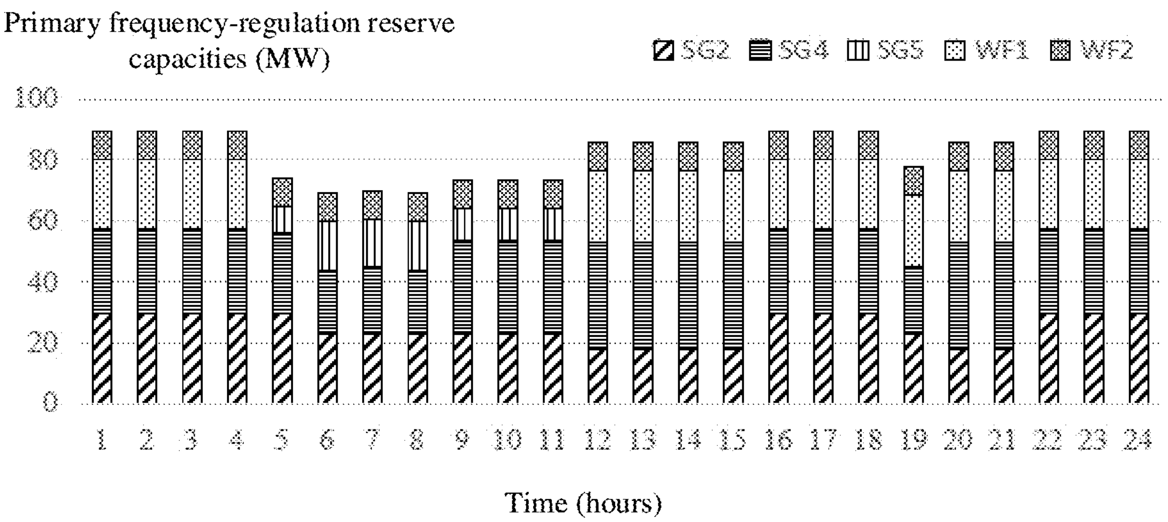
FIG. 11 is a schematic diagram showing a result of a primary frequency-regulation reserve capacity of the power system in accordance with an embodiment.

A schedule of primary frequency-regulation reserve capacities obtained by using the techniques of the present disclosure is shown in FIG. 11. In FIG. 11, the abscissa represents the scheduling time period in hours considered in the present disclosure. The ordinate represents the schedule of the primary frequency-regulation reserve capacity in MWs of each power generator set. "/" shaded graphic indicates the primary frequency-regulation reserve capacity of the conventional energy power generator set SG2. "–" shaded graphic indicates the primary frequency-regulation reserve capacity of the conventional energy power generator set SG4. "|" shaded graphic indicates the primary frequency-regulation reserve capacity of the conventional energy power generator set SG5. "." shaded graphic indicates the primary frequency-regulation reserve capacity of the wind farm WF1. "x" shaded graphic indicates the primary frequency-regulation reserve capacity of the wind farm WF2. As can be seen from the figure, in the time periods from the 1st to the 4th hour and from the 12th to the 24th hour, the post-fault primary frequency-regulation reserve capacities are provided by the conventional energy power generator sets SG2 and SG4, and the wind farms WF1 and WF2. In the time periods from the 5th hour to the 11th hour, the post-fault primary frequency-regulation reserve capacities are provided by the conventional energy power generator sets SG2, SG4, SG5 and the wind farm WF2.

Figure 12:
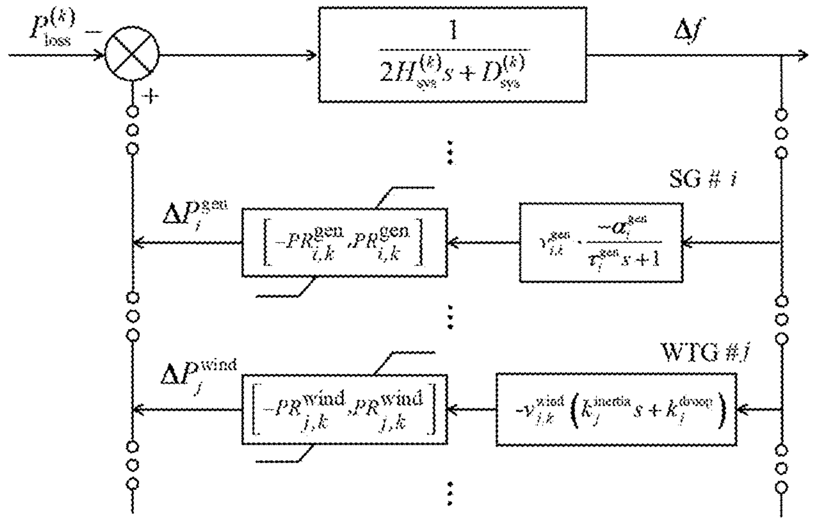
FIG. 12 is a schematic diagram showing a system frequency dynamic model of the power system in accordance with an embodiment.
Figure 13:
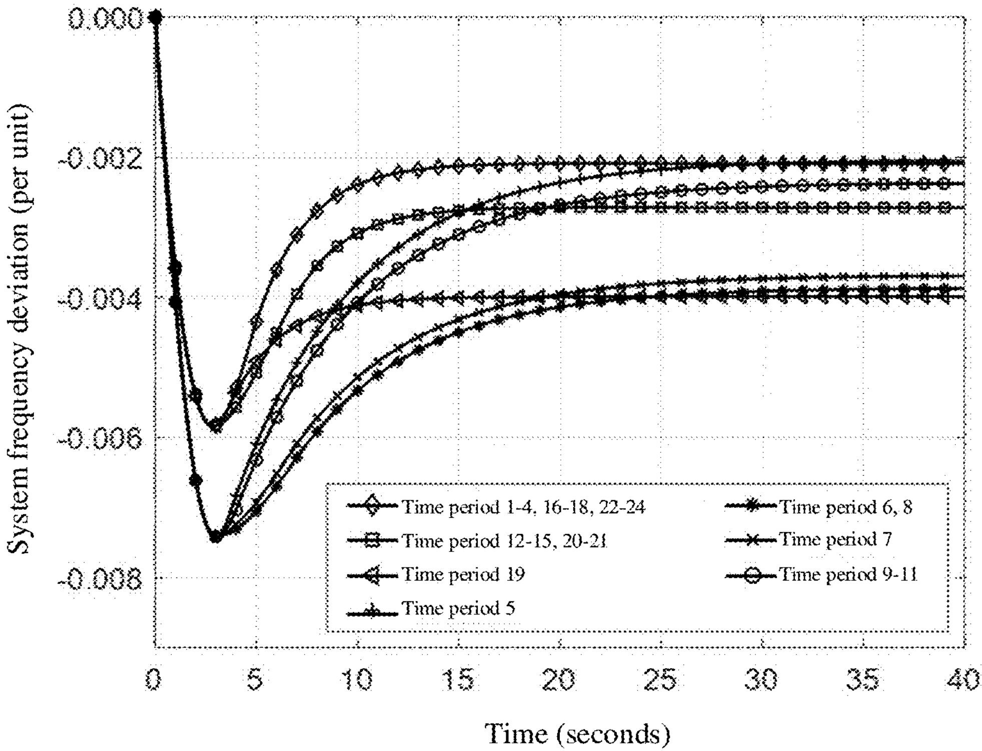
FIG. 13 is a schematic diagram showing post-fault system frequency differences during a primary frequency regulation in each time period in accordance with an embodiment of the present disclosure.

The system shown in FIG. 12 is built in SimStudio, which is an electromagnetic transient simulation platform, according to the obtained schedule of reserve capacities of frequency regulation. The results obtained by the method of the present disclosure are verified by simulation, and the simulation result is shown in FIG. 13. In FIG. 13, the abscissa represents time in seconds of the post-fault primary frequency regulation process, and the ordinate represents a per unit value of the frequency deviation of the frequency of the COI of the power system. A solid line embellished by "◇" represents the post-fault frequency performance in the time periods 1 to 4, 16 to 18, and 22 to 24. The solid line embellished by "□" represents the post-fault frequency performance in the time periods 12 to 15, and 20 to 21. The solid line embellished by "Δ" represents the post-fault frequency performance in the time period 19. The solid line embellished by "+" represents the post-fault frequency performance in the time period 5. The solid line embellished by "*" represents the post-fault frequency performance in the time periods 6 and 8. The solid line embellished by "x" represents the post-fault frequency performance in the time period 7. The solid line embellished by "○" represents the post-fault frequency performance in the time periods 9 to 11. It can be seen that the post-fault frequency performance in any time period meets the security requirement of the frequency indexes of the system. The calculation accuracy of the frequency indexes according to the present disclosure is shown in Tables 2 to 4. It can be seen that the maximum relative error of the index $$\Delta f_{nadir}^{(k)}$$

is 0.63%, the maximum relative error of the index $$\Delta f_{ss}^{(k)}$$

is 0.37%, and the maximum relative error of the index $$RoCoF_{max}^{(k)}$$

is 0.16%. Therefore, the method of the present disclosure can accurately construct the dynamic model including the amplitude limiting for the post-fault frequency of the system.

Conventional technologies in which the primary frequency-regulation reserve capacities are allocated in proportion to the capacities of the power generation sets are shown in Table 5. The fault size is set to 89.6 MW, and the security index requirement for regulating frequency is $$\overline{RoCoF} = 0.006(p.u.).$$

Figure 14:
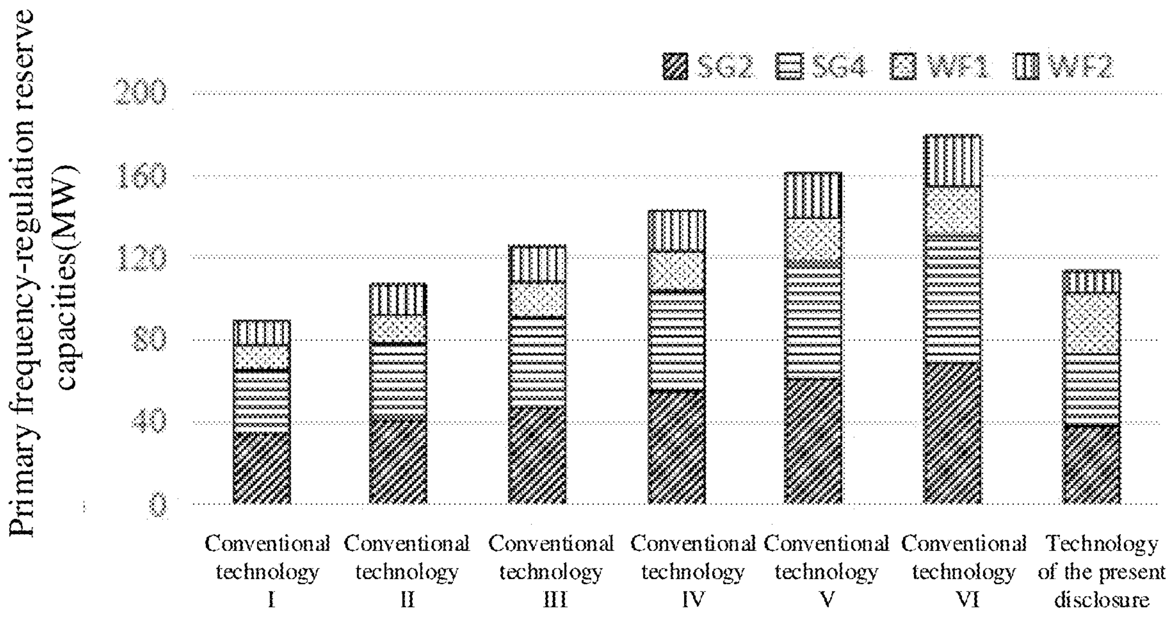
FIG. 14 is a schematic diagram showing results of the primary frequency-regulation reserve capacities in a time period k=1 of the present disclosure and the conventional technologies in accordance with an embodiment.

The schedule results of the primary frequency-regulation reserve capacities of the present disclosure and the conventional technologies during the time period k=1 are shown in FIG. 14. In FIG. 14, the abscissa represents the conventional technologies I to VI and the technology of the present disclosure, and the ordinate represents the schedule of the primary frequency-regulation reserve capacity in MW of each power generation set. "/" shaded graphic indicates the primary frequency-regulation reserve capacity of the conventional energy power generator set SG2. "-" shaded graphic indicates the primary frequency-regulation reserve capacity of the conventional energy power generator set SG4. "." shaded graphic indicates the primary frequency-regulation reserve capacity of the wind farm WF1. "|" shaded graphic indicates the primary frequency-regulation reserve capacity of the wind farm WF2. It can be seen that the technique of the present disclosure automatically calculates that the total primary frequency-regulation reserve capacity required is about 127.6% of the fault size, while in the conventional technologies, the total primary frequency-regulation reserve capacity is required to be determined artificially in advance.

Figure 15:
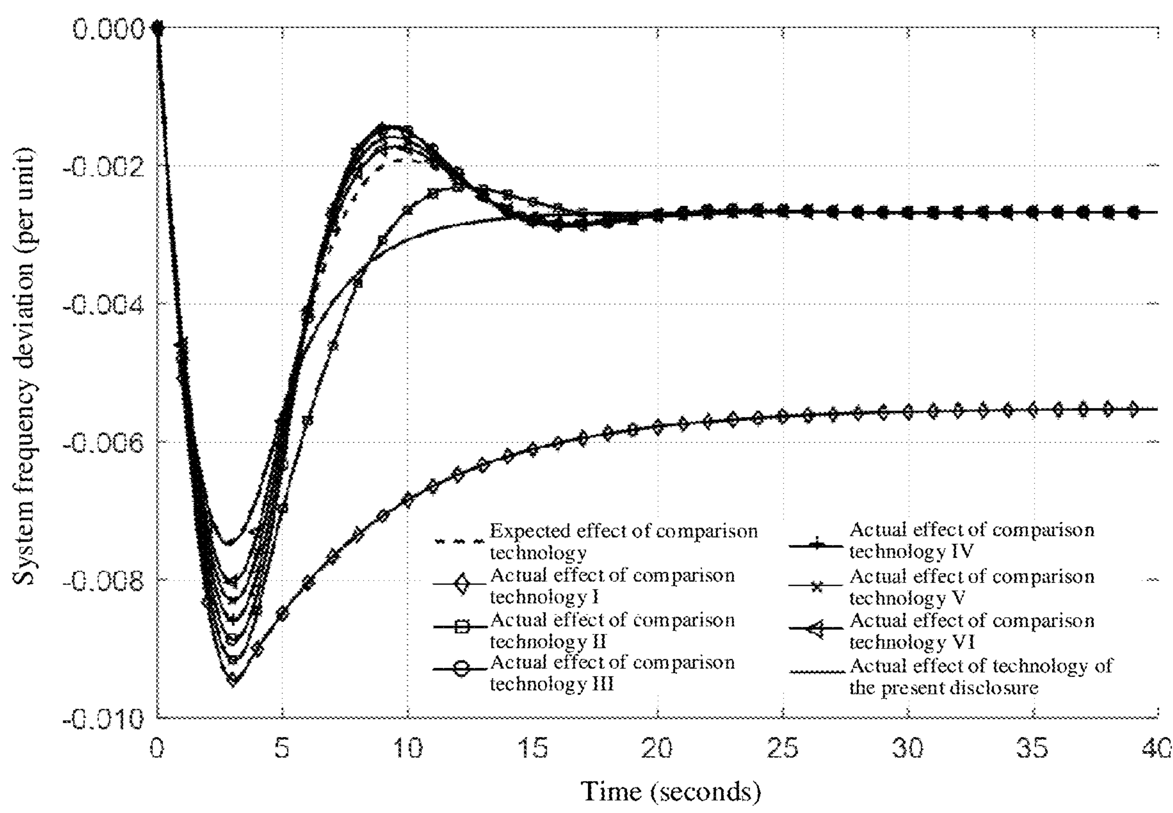
FIG. 15 is a schematic diagram showing post-fault frequency differences during the primary frequency regulation in the time period k=1 of the present disclosure and the conventional technologies in accordance with an embodiment.

The post-fault frequency performance of the present disclosure and the comparison technologies (i.e., the conventional technologies) in the time period is shown in FIG. 15. In FIG. 15, the abscissa represents the time in seconds of the post-fault primary frequency regulation process, and the ordinate represents the per unit value of the frequency deviation of the frequency of the COI of the power system. "--" shaded graphic represents the expected frequency performance of the comparison technologies I to VI without the amplitude limiting. The solid line embellished by "◇" represents the actual frequency performance of the comparison technology I. The solid line embellished by "□" represents the actual frequency performance of the comparison technology II. The solid line embellished by "○" represents the actual frequency performance of the comparison technology III. The solid line embellished by "+" represents the actual frequency performance of the comparison technology IV. The solid line embellished by "x" represents the actual frequency performance of the comparison technology V. The solid line embellished by "Δ" represents the actual frequency performance of the comparison technology VI. The solid line without any embellishment represents the actual frequency performance of the technology of the present disclosure. It can be seen that the comparison technologies I to V violates the requirement for the maximum frequency deviation $$\Delta f_{nadir}^{(k)}$$

and the comparison technology I violates the requirement for the absolute value of the steady-state frequency deviation $$\Delta f_{ss}^{(k)}$$

Although the comparison technology VI satisfies the requirement for the frequency index, the total primary frequency-regulation reserve capacity is twice the fault size. Whereas the technology of the present disclosure automatically calculates the optimal total primary frequency-regulation reserve capacity and an allocation scheme thereof among the power generator sets, which satisfy that the total primary frequency-regulation reserve capacity required for all frequency indexes is only 127.6% of the fault size.

TABLE 1

Parameters of Conventional Energy Power Generator Sets

| | SG1 | SG2 | SG3 | SG4 | SG5 |
|---|---|---|---|---|---|
| $\underline{P}_i^{gen}$(MW) | 70 | 170 | 40 | 100 | 50 |
| $\overline{P}_i^{gen}$(MW) | 70 | 570 | 100 | 520 | 200 |
| $T_i^{on/off}$(h) | 3 | 8 | 5 | 8 | 6 |
| $RR_i^{UP/DW}$ (MW/h) | 30 | 200 | 40 | 170 | 60 |
| $RR_i^{SU/SD}$ (MW/h) | 70 | 200 | 40 | 170 | 60 |
| $RR_i^{SFR}$ (MW/min) | 2 | 0.5 | 2 | 0.5 | 0.5 |
| $C_i^{SU/SD}$($) | 170 | 4500 | 550 | 5000 | 900 |
| $C_i^{fixed}$($/h) | 370 | 1000 | 700 | 970 | 450 |
| $C_i^{incr}$($/MW·h) | 22.26 | 16.19 | 16.6 | 17.26 | 19.70 |
| $H_i^{gen}(p.u.)$ | 3.3 | 5.3 | 4.1 | 5.3 | 4.1 |
| $d_i^{gen}(p.u.)$ | 1.5 | 2 | 1.8 | 2 | 1.8 |
| $\tau_i^{gen}(p.u.)$ | 6 | 8 | 7.2 | 8 | 7.2 |
| $\alpha_i^{gen}(p.u.)$ | 17 | 25 | 20 | 25 | 21 |

TABLE 2

Comparison of Maximum Frequency Deviation $\Delta f_{nadir}^{(k)}$ between Calculation Result and Simulation Result

| Time period k | The present disclosure (per unit value) | Simulation result (per unit value) | Relative error |
|---|---|---|---|
| 1 to 4, 12 to 24 | $-5.8205 \times 10^{-3}$ | $-5.8391 \times 10^{-3}$ | 0.32% |
| 5 to 11 | $-7.3651 \times 10^{-3}$ | $-7.4118 \times 10^{-3}$ | 0.63% |

TABLE 3

Comparison of Absolute Value of Steady-state Frequency Deviation $\Delta f_{ss}^{(k)}$ between Calculation Result and Simulation Result

| Time period k | The present disclosure (per unit value) | Simulation result (per unit value) | Relative error |
|---|---|---|---|
| 1 to 4, 16 to 18, 22 to 24 | $-2.0939\times10^{-3}$ | $-2.0920\times10^{-3}$ | 0.09% |
| 12 to 15, 20 to 21 | $-2.7218\times10^{-3}$ | $-2.7185\times10^{-3}$ | 0.12% |
| 19 | $-3.9999\times10^{-3}$ | $-3.9893\times10^{-3}$ | 0.27% |
| 5 | $-2.0594\times10^{-3}$ | $-2.0542\times10^{-3}$ | 0.25% |
| 6, 8 | $-3.8883\times10^{-3}$ | $-3.8745\times10^{-3}$ | 0.35% |
| 7 | $-3.7092\times10^{-3}$ | $-3.6957\times10^{-3}$ | 0.37% |
| 9 to 11 | $-2.3860\times10^{-3}$ | $-2.3775\times10^{-3}$ | 0.36% |

TABLE 4

Comparison of Absolute Value of Maximum RoCoF $RoCoF_{max}^{(k)}$ between Calculation Result and Simulation Result

| Time period k | The present disclosure (per unit value) | Simulation result (per unit value) | Relative error |
|---|---|---|---|
| 1 to 4, 12 to 24 | $4.5005\times10^{-3}$ | $4.4934\times10^{-3}$ | 0.16% |
| 5 to 11 | $4.6071\times10^{-3}$ | $4.6009\times10^{-3}$ | 0.13% |

TABLE 5

Description of Conventional Technology

| | Decision-making manner for frequency-regulation reserve capacity | Frequency dynamic model constructing |
|---|---|---|
| The present disclosure | Automatic optimal decision | With amplitude limiting |
| Conventional technology I | Man-made rule: a total primary frequency-regulation reserve capacity is equal to 100% of the fault size, and is allocated among the power generation sets according to capacity ratios | Without amplitude limiting |
| Conventional technology II | Man-made rule: a total primary frequency-regulation reserve capacity is equal to 120% of the fault size, and is allocated among the power generation sets according to capacity ratios | Without amplitude limiting |
| Conventional technology III | Man-made rule: a total primary frequency-regulation reserve capacity is equal to 140% of the fault size, and is allocated among the power generation sets according to capacity ratios | Without amplitude limiting |
| Conventional technology IV | Man-made rule: a total primary frequency-regulation reserve capacity is equal to 160% of the fault size, and is allocated among the power generation sets according to capacity ratios | Without amplitude limiting |
| Conventional technology V | Man-made rule: a total primary frequency-regulation reserve capacity is equal to 180% of the fault size, and is allocated among the power generation sets according to capacity ratios | Without amplitude limiting |
| Conventional technology VI | Man-made rule: a total primary frequency-regulation reserve capacity is equal to 200% of the fault size, and is allocated among the power generation sets according to capacity ratios | Without amplitude limiting |

It is to be understood that although the various steps in the flowcharts involved in various aforementioned embodiments are displayed in sequence as indicated by the arrows, these steps are not necessarily performed in sequence in the order indicated by the arrows. Unless expressly stated herein, the execution of these steps is not strictly restrictive and may be performed in other orders. Moreover, at least part of the steps in the flowcharts involved in various aforementioned embodiments may include a plurality of steps or a plurality of stages, which are not necessarily performed at the same moment, but may be executed at different moments, and these steps or stages are not necessarily performed sequentially, but may be performed in turn or alternately with other steps or at least part of the steps or stages of other steps.

Based on the same inventive concept, the embodiments of the present disclosure further provide an apparatus of frequency regulation of a power system involving renewable energy power generation for performing the above method of frequency regulation of the power system involving renewable energy power generation. The solutions provided by the apparatus to resolve the technical issue are similar to the solutions described in the above method. Therefore, for specific limitations of one or more embodiments of the apparatus of frequency regulation of a power system involving renewable energy power generation, references may be made to the above limitations of the method of frequency regulation of the power system involving renewable energy power generation, which will not be repeated hereinafter.

Figure 16:
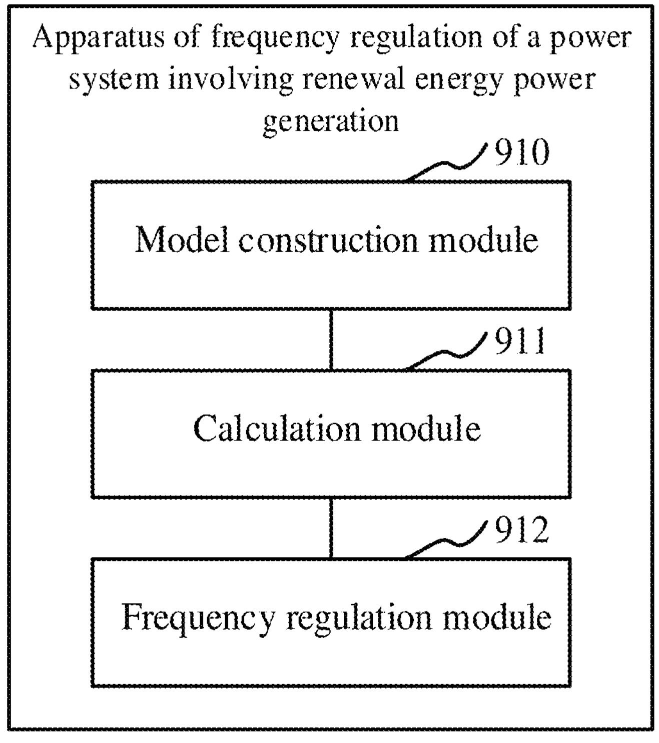
FIG. 16 is a block diagram showing a structure of an apparatus of frequency regulation of the power system involving renewable energy power generation in accordance with an embodiment.

In an embodiment, as shown in FIG. 16, an apparatus of frequency regulation of a power system involving renewable energy power generation is provided. The apparatus includes: a model construction module 910, a calculation module 911, and a frequency regulation module 912.

The model construction module 910 is configured to construct a system frequency dynamic model according to parameters associated with power generator sets in the power system.

The calculation module 911 is configured to calculate secure operation indexes of the power system according to the system frequency dynamic model of the power system.

The frequency regulation module 912 is configured to obtain system comprehensive cost indexes of the power system, construct a reserve allocation model of the power generator sets according to the system comprehensive cost indexes and the secure operation indexes of the power system, and adjust a system frequency of the power system according to the reserve allocation model.

In an embodiment, the model construction module 910 includes: a parameter acquisition submodule 9101 and a model construction submodule 9102.

The parameter acquisition submodule 9101 is configured to obtain a largest imbalanced power, parameters of the conventional energy power generator set, and parameters of the renewable energy power generator set.

The system frequency dynamic model construction submodule 9102 is configured to construct the system frequency dynamic model of the power system during the power generation according to the largest imbalanced power, the parameters of the conventional energy power generator set, and the parameters of the renewable energy power generator set.

In an embodiment, the system frequency dynamic model construction submodule 9102 is configured to obtain an equivalent inertia time constant and an equivalent damping coefficient of a preset time period according to the parameters of the conventional energy power generator set and the parameters of the renewable energy power generator set; and configured to construct the system frequency dynamic model according to the equivalent inertia time constant, the equivalent damping coefficient, the largest imbalanced power, the parameters of the conventional energy power generator set, and the parameters of the renewable energy power generator set.

In an embodiment, the calculation module 911 includes: a first calculation submodule 9111, a second calculation submodule 9112, and a third calculation submodule 9113.

The first calculation submodule 9111 is configured to calculate an absolute value of the maximum RoCoF of the power system, according to a post-fault instantaneous power change amount of the renewable energy power generator set in the preset time period, and the equivalent inertia time constant, and the largest imbalanced power in the preset time period.

The second calculation submodule 9112 is configured to calculate a steady-state power deviation of the conventional energy power generator set, a steady-state power deviation of the renewable energy power generator set, and an absolute value of a steady-state frequency deviation of the power system, according to the equivalent damping coefficient, the largest imbalanced power, the parameters of the conventional energy power generator set, and the parameters of the renewable energy power generator set in the preset time period.

The third calculation submodule 9113 is configured to calculate a maximum frequency deviation of the power system according to the parameters of the conventional energy power generator set, the parameters of the renewable energy power generator set, and the largest imbalanced power combining with a preset piecewise linear function.

In an embodiment, the third calculation submodule 9113 is configured to determine a space division of a definition domain of the preset piecewise linear function, generate data samples of the preset piecewise linear function, determine parameters values of the preset piecewise linear function based on the space division of the definition domain of the preset piecewise linear function and the data samples, and construct the preset piecewise linear function; configured to construct linear constraint conditions of the preset piecewise linear function; and configured to calculate the maximum frequency deviation of the power system according to the preset piecewise linear function and the linear constraint conditions.

In an embodiment, the frequency regulation module 912 includes: an objective function construction submodule 9121, a constraint submodule 9122, a reserve allocation model construction submodule 9123, and an optimal solution calculation submodule 9124.

The objective function construction submodule 9121 is configured to construct the system comprehensive cost indexes based on the parameters of the conventional energy power generator set and the parameters of the renewable energy power generator set, and construct an optimization objective function based on the system comprehensive cost indexes.

The constraint submodule 9122 is configured to construct constraint conditions of the secure operation indexes of the power system.

The reserve allocation model construction submodule 9123 is configured to construct the reserve allocation model of the power generator sets according to the optimization objective function and the constraint conditions.

The optimal solution calculation submodule 9124 is configured to calculate an optimal solution of the reserve allocation model of the power generator sets, and adjust a reserve capacity of the renewable energy power generator set and a reserve capacity of the conventional energy power generator set based on the optimal solution, so as to regulate the system frequency of the power system.

In an embodiment, the constraint submodule 9122 is configured to construct combination constraint conditions and operation constraint conditions of the conventional energy power generator sets, and operation constraint conditions of the renewable energy power generator sets; and configured to construct a power balance constraint condition of the power system and a constraint condition of the reserve capacity constraint condition of the power system after a tertiary frequency regulation; and configured to construct a line power flow constraint condition of the power system in a normal operation condition and a line power flow constraint condition of the power system after the primary frequency regulation; and configured to construct a secondary frequency regulation of the power system, and constraint conditions of a frequency security of the dynamic of the power system in the primary frequency regulation.

Modules in the apparatus of frequency regulation of the power system involving renewable energy power generation above, all or partial, may be implemented by software, hardware, or combinations thereof. The modules above each may be embedded in or independent of a processor of a computer device in the form of hardware, or may be stored in a memory of the computer device in the form of software, so that the processor may call and execute respective operations of the modules above.

In an embodiment, a computer device is provided. The computer device may be a server, and an internal structure thereof may be shown in FIG. 17. The computer device includes a processor, a memory, and a communication interface, which are connected by a system bus. The processor of the computer device is configured to perform computation and control. The memory of the computer device includes non-transitory storage medium and internal memory. The non-transitory storage medium stores an operating system, computer programs, and a database. The internal memory provides an operation environment for the operating system and the computer programs in the non-transitory storage medium. The database of the computer device is configured to store the frequency regulation data of the power system involving renewable energy power generation. The network interface of the computer device is used for communication with an external terminal through network. The computer program, when executed by the processor, causes the processor to perform the above method of frequency regulation of the power system involving renewable energy power generation.

In an embodiment, a computer device is provided. The computer device may be a terminal, and an internal structure thereof may be shown in FIG. 17. The computer device includes a processor, a memory, a communication interface, a display, and an input device, which are connected by a system bus. The processor of the computer device is configured to perform computation and control. The memory of the computer device includes a non-transitory storage medium and an internal memory. The non-transitory storage medium stores an operating system and computer programs. The internal memory provides an operation environment for the operating system and the computer programs in the non-transitory storage medium. The communication interface of the computer device is used for wired or wireless communication with an external terminal, and the wireless communication may be realized by WIFI, mobile cellular network, NFC (Near Field Communication) or other technologies. The computer program, when executed by the processor, causes the processor to perform the above method of frequency regulation of the power system involving renewable energy power generation.

Figure 17:
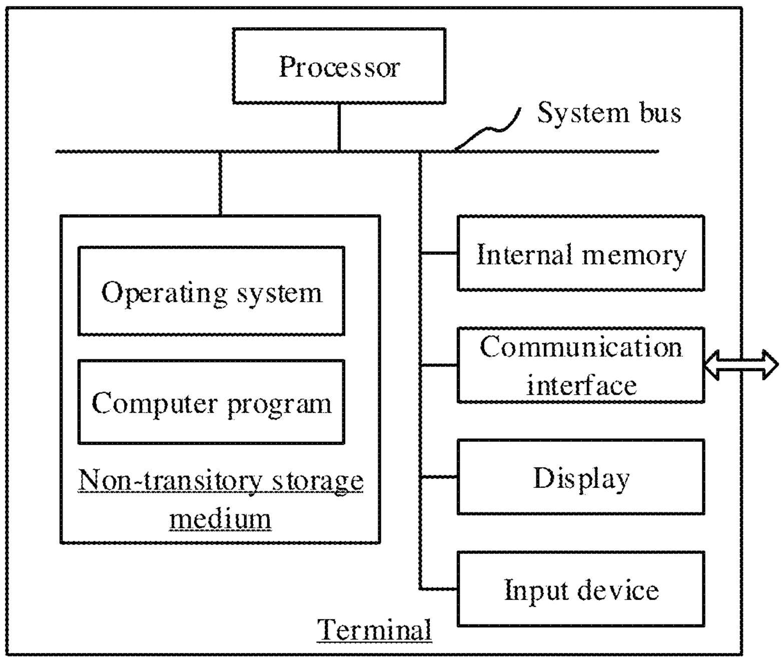
FIG. 17 is a view showing an internal structure of a computer device in accordance with an embodiment.

An ordinary skilled in the art may understand that, FIG. 17 is only a block diagram showing part of a structure related to solutions of the present disclosure, but does not limit the computer device to which the solutions of the present disclosure are applied. Specifically, the computer device may include more or fewer components than those in the drawings, or include a combination of some components, or include different layouts of components.

In an embodiment, a computer device is provided. The computer device includes a memory and a processor. Computer programs are stored in the memory, and the processor, when executing the computer programs, performs the steps in the embodiments of the above method of frequency regulation of the power system involving renewable energy power generation.

In an embodiment, a non-transitory computer readable storage medium is provided, and computer programs are stored in the computer readable storage medium. The computer programs, when executed by the processor, cause the processor to perform the steps in the embodiments of the above method of frequency regulation of the power system involving renewable energy power generation.

In an embodiment, a computer program product is provided, and includes computer programs. The computer programs, when executed by the processor, cause the processor to perform the steps in the embodiments of the above method of frequency regulation of the power system involving renewable energy power generation.

The technical features of the embodiments described above may be combined arbitrarily. For the sake of concise description, not all possible combinations of the technical features in the above-described embodiments are described. However, as long as there is no contradiction in the combinations of these technical features, the combinations should be regarded to be within the scope of this specification.

What described above are several embodiments of the present disclosure, and the illustrations thereof are relatively specific and detailed, but cannot be understood to be limitation on the scope of the present disclosure. It should be noted that, for those skilled in the art, several modifications and improvements may be made without departing from the concept of the present disclosure, and they all fall into the protection scope of the present disclosure. Accordingly, the protection scope of the present disclosure should be subject to the appended claims.

What is claimed is:

1. A method of frequency regulation of a power system involving renewable energy power generation, comprising:

constructing a system frequency dynamic model according to parameters associated with power generator sets in the power system, comprising:

obtaining a largest imbalanced power, parameters of the conventional energy power generator set, and parameters of the renewable energy power generator set;

obtaining an equivalent inertia time constant and an equivalent damping coefficient in a preset time period according to the parameters of the conventional energy power generator set and the parameters of the renewable energy power generator set; and constructing the system frequency dynamic model according to the equivalent inertia time constant, the equivalent damping coefficient, the largest imbalanced power, the parameters of the conventional energy power generator set, and the parameters of the renewable energy power generator set; the power generator sets comprising a renewable energy power generator set and a conventional energy power generator set;

calculating secure operation indexes of the power system according to the system frequency dynamic model of the power system, comprising:

calculating an absolute value of a maximum Rate-of-Change-of-Frequency (RoCoF) of the power system according to a post-fault instantaneous power change amount of the renewable energy power generator set in the preset time period, the equivalent inertia time constant and the largest imbalanced power in the preset time period;

calculating a steady-state power deviation of the conventional energy power generator set, a steady-state power deviation of the renewable energy power generator set, and an absolute value of a steady-state frequency deviation of the power system, according to the equivalent damping coefficient, the largest imbalanced power, the parameters of the conventional energy power generator set, and the parameters of the renewable energy power generator set in the preset time period; and calculating a maximum frequency deviation of the power system, according to the parameters of the conventional energy power generator set, the parameters of the renewable energy power generator set, and the largest imbalanced power combining with a preset piecewise linear function; and obtaining system comprehensive cost indexes of the power system, constructing a reserve allocation model of the power generator sets according to the system comprehensive cost indexes and the secure operation indexes of the power system, and regulating a system frequency of the power system according to the reserve allocation model.

2. The method of claim 1, wherein the calculating the maximum frequency deviation of the power system, according to the parameters of the conventional energy power generator set, the parameters of the renewable energy power generator set, and the largest imbalanced power combining with the preset piecewise linear function, comprises:

determining a space division of a definition domain of the preset piecewise linear function, generating data samples of the preset piecewise linear function, determining parameters values of the preset piecewise linear function based on the space division of the definition domain of the preset piecewise linear function and the data samples, and constructing the preset piecewise linear function;

constructing linear constraint conditions of the preset piecewise linear function; and calculating the maximum frequency deviation of the power system according to the preset piecewise linear function and the linear constraint conditions.

3. The method of claim 1, wherein the obtaining the system comprehensive cost indexes of the power system, constructing the reserve allocation model of the power generator sets according to the system comprehensive cost indexes and the secure operation indexes of the power system, and regulating the system frequency of the power system according to the reserve allocation model, comprises:

constructing the system comprehensive cost indexes based on the parameters of the conventional energy power generator set and the parameters of the renewable energy power generator set, and constructing an optimization objective function based on the system comprehensive cost indexes;

constructing constraint conditions of the secure operation indexes of the power system;

constructing the reserve allocation model of the power generator sets according to the optimization objective function and the constraint conditions; and calculating an optimal solution of the reserve allocation model of the power generator sets, and adjusting a reserve capacity of the renewable energy power generator set and a reserve capacity of the conventional energy power generator set based on the optimal solution to regulate the system frequency of the power system.

4. The method of claim 3, wherein the constructing the constraint conditions of the secure operation indexes of the power system, comprises:

constructing combination constraint conditions and operation constraint conditions of the conventional energy power generator set, and operation constraint conditions of the renewable energy power generator set;

constructing a power balance constraint condition of the power system and a constraint condition of the reserve capacity of the power system after a tertiary frequency regulation;

constructing a line power flow constraint condition of the power system in a normal operation condition and a line power flow constraint condition of the power system after the primary frequency regulation; and constructing constraint conditions of a secondary frequency regulation of the power system, and constraint conditions of a frequency security of the power system in a dynamic of the primary frequency regulation.

5. The method of claim 1, wherein the system frequency dynamic model after an accident in the time period k comprises:

$$2H_{sys}^{(k)}\Delta f(t) = -D_{sys}^{(k)}\Delta f(t) + \sum_{i\in N_G}\Delta P_i^{gen}(t) + \sum_{j\in N_W}\Delta P_j^{wind}(t) - P_{loss}^{(k)}$$

-continued $$H_{sys}^{(k)} = \sum_{i\in N_G} v_{i,k}^{gen} H_i^{gen}$$

$$D_{sys}^{(k)} = \sum_{i\in N_G} v_{i,k}^{gen} d_i^{gen}$$

$$\begin{cases}\tau_i^{gen}\Delta P_i^{gen}(t) = -\Delta P_i^{gen}(t) - \alpha_i^{gen}\Delta f(t), \text{ if } v_{i,k}^{gen} = 1, \ \forall\, i\in N_G\\ \Delta P_i^{gen}(t) = 0, \text{ if } v_{i,k}^{gen} = 0, \ \forall\, i\in N_G\end{cases}$$

$$|\Delta P_i^{gen}(t)| \le PR_{i,k}^{gen}, \ \forall\, i\in N_G$$

$$\begin{cases}\Delta P_j^{wind}(t) = -k_j^{inertia}\Delta f(t) - k_j^{droop}\Delta f(t), \text{ if } v_{j,k}^{wind} = 1, \ \forall\, j\in N_W\\ \Delta P_j^{wind}(t) = 0, \text{ if } v_{j,k}^{wind} = 0, \ \forall\, j\in N_W\end{cases}$$

$$\left|\Delta P_j^{wind}(t)\right| \le PR_{j,k}^{wind}, \ \forall\, j\in N_W$$

wherein the parameters of the conventional energy power generator set comprises:

$$H_i^{gen}$$

representing an inertia time constant, $$d_i^{gen}$$

represent a damping coefficient, $$\tau_i^{gen}$$

representing a time constant, $$\alpha_i^{gen}$$

representing a speed governor coefficient, $N_G$ representing a group of conventional energy power generator sets, and $n_G$ representing a number of conventional energy power generator sets in the group;

wherein the parameters of the renewable energy power generator set comprise:

$$k_j^{intertia}$$

representing a virtual inertia time constant of the renewable energy power j, $$k_j^{droop}$$

representing a droop control coefficient of the renewable energy power generator set j, $N_W$ representing a group of renewable energy power generator sets, $n_W$ representing a number of renewable energy power generator sets in the group;

$$H_{sys}^{(k)}$$

represents an equivalent inertia time constant, $$D_{sys}^{(k)}$$

represents an equivalent damping coefficient, Δf(t) represents a frequency deviation of a frequency of a center of inertia of the power system, $$\Delta P_i^{gen}(t)$$

represents a power regulation amount of the conventional energy power generator set i, $$\Delta P_j^{wind}(t)$$

represents a power regulation amount of the renewable energy power generator set j, $$P_{loss}^{(k)}$$

represent a largest imbalanced power, a Boolean variable $$v_{i,k}^{gen}$$

represents whether the conventional energy power generator set i participates in the primary frequency regulation or not in the time period k, a Boolean variable $$v_{j,k}^{wind}$$

represents whether the renewable energy power generator set j participates in the primary frequency regulation or not in the time period k, $$PR_{i,k}^{gen}$$

represents a primary frequency-regulation reserve capacity of the conventional energy power generator set i in the time period k, and $$PR_{j,k}^{wind}$$

represents a primary frequency-regulation reserve capacity of the renewable energy power generator set j in the time period k.

6. The method of claim 1, wherein the calculating the absolute value of the maximum RoCoF of the power system $$RoCoF_{max}^{(k)}$$

comprise:

$$-2H_{sys}^{(k)}RoCoF_{max}^{(k)} = -P_{loss}^{(k)} + \sum_j \Delta P_{wini\_j}^{(k)}$$

$$\Delta P_{wini\_j}^{(k)} = v_{j,k}^{wind}\min\{k_j^{intertia}RoCoF_{max}^{(k)}, PR_{j,k}^{wind}\}, \forall j$$

wherein $$\Delta P_{wini\_j}^{(k)}$$

represents a post-fault instantaneous power change amount of the renewable energy power generator set in the preset time period k, an instantaneous power support is achieved by a virtual inertia control, $$P_{loss}^{(k)}$$

represents the largest imbalanced power, $$H_{sys}^{(k)}$$

represents the equivalent inertia time constant, a Boolean variable $$v_{j,k}^{wind}$$

represents whether the renewable energy power generator set j participates in the primary frequency regulation or not in the time period k, $$k_j^{inertia}$$

represents a virtual inertia time constant of the renewable energy power generator set j, and $$PR_{j,k}^{wind}$$

represent a primary frequency-regulation reserve capacity of the renewable energy power generator set j in the time period k.

7. The method of claim 1, wherein equations for calculating the steady-state power deviation of the conventional energy power generator set, the steady-state power deviation of the renewable energy power generator set, and the absolute value of the steady-state frequency deviation of the power system comprise:

$$D_{sys}^{(k)}\Delta f_{ss}^{(k)} = -P_{loss}^{(k)} + \sum_i \Delta P_{gss\_i}^{(k)} + \sum_j \Delta P_{wss\_j}^{(k)}$$

$$\Delta P_{gss\_i}^{(k)} = v_{i,k}^{gen}\min\{-\alpha_i^{gen}\Delta f_{ss}^{(k)},\ PR_{i,k}^{gen}\},\ \forall\ i$$

$$\Delta P_{wss\_j}^{(k)} = v_{j,k}^{wind}\min\{-k_j^{droop}\Delta f_{ss}^{(k)},\ PR_{j,k}^{wind}\},\ \forall\ j$$

wherein $$\Delta P_{gss\_i}^{(k)}$$

represents the steady-state power deviation of the conventional energy power generator set, $$\Delta P_{wss\_j}^{(k)}$$

represents the steady-state power deviation of the renewable energy power generator set, $$\Delta f_{ss}^{(k)}$$

represents the absolute value of the steady-state frequency deviation of the power system, $$D_{sys}^{(k)}$$

represents an equivalent damping coefficient of the preset time period k, $$P_{loss}^{(k)}$$

represents the largest imbalanced power, $$\alpha_i^{gen}$$

represents a speed governor coefficient, $$k_j^{droop}$$

represents a droop control coefficient of the renewable energy power generator set j, $$PR_{i,k}^{gen}$$

represents a primary frequency-regulation reserve capacity of the conventional energy power generator set in the time period k, and $$PR_{j,k}^{wind}$$

represents a primary frequency-regulation reserve capacity of the renewable energy power generator set j in the time period k, a Boolean variable $$v_{i,k}^{gen}$$

represents whether the conventional energy power generator set i participates in the primary frequency regulation or not in the time period k, and a Boolean variable $$v_{j,k}^{wind}$$

represents whether the renewable energy power generator set j participates in the primary frequency regulation or not in the time period k.

8. The method of claim 3, wherein the optimization objective function comprises:

$$\min \sum_k \left( \begin{array}{l} \sum_i \left( C_i^{fixed} u_{i,k} + C_i^{SU} z_{i,k}^{SU} + C_i^{sD} z_{i,k}^{SD} + C_i^{incr} P_{i,k}^{gen} \right) + \\ \sum_j C_j^{pen} \left( P_{j,k}^{mppt} - P_{j,k}^{wind} - PR_{j,k}^{wind} - SR_{j,k}^{wind} - TR_{j,k}^{wind} \right) \end{array} \right)$$

$$\text{over} \left\{ \begin{array}{c} u_{i,k},\ z_{i,k}^{SU},\ z_{i,k}^{SD},\ v_{i,k}^{gen},\ v_{j,k}^{wind},\ P_{i,k}^{gen},\ P_{j,k}^{wind},\ z_{i,k}^{gen},\ z_{j,k}^{wind} \\ PR_{i,k}^{gen},\ PR_{j,k}^{wind},\ SR_{i,k}^{gen},\ SR_{j,k}^{wind},\ TR_{i,k}^{gen},\ TR_{j,k}^{wind} \end{array} \right\}$$

wherein the parameters of the conventional energy power generator set comprise:

$$C_i^{fixed}$$

representing a fixed cost coefficient of power generation, $$C_i^{SU}$$

representing a set start-up cost coefficient, $$C_i^{SD}$$

representing a set shutdown cost coefficient, $$C_i^{incr}$$

representing a variable cost coefficient of power generation, $u_{i,k}$ representing an on/off state of the conventional energy power generator set i in the time period k, and a Boolean variable $$v_{i,k}^{gen}$$

representing whether the conventional energy power generator set i participates in the primary frequency regulation or not in the time period k; and wherein the parameters of the renewable energy power generator set comprise:

$$C_j^{pen}$$

representing a wind curtailment penalty coefficient of the renewable energy power generator set j, $$P_{j,k}^{mppt}$$

representing a predicted value of a maximum power point tracking of the renewable energy power generator set j in the time period k, a Boolean variable $$v_{j,k}^{wind}$$

renewable energy power generator set j participates in the primary frequency regulation or not in the time period k;

the system comprehensive cost indexes comprise: a decision variable $u_{i,k}$ representing the on/off state of the conventional energy power generator set i in the time k, $$z_{i,k}^{SU}$$

and $$z_{i,k}^{SD}$$

representing startup and shutdown actions of the conventional energy power generator set i in the time period k, respectively, $$P_{i,k}^{gen}$$

representing a planned output of the conventional energy power generator set i in the time period k, $$P_{j,k}^{wind}$$

representing an actual output of the renewable energy power generator set j in the time period k, $$PR_{i,k}^{gen},\ SR_{i,k}^{gen} \text{ and } TR_{i,k}^{gen}$$

representing a primary frequency-regulation reserve capacity, a secondary frequency-regulation reserve capacity, and a tertiary frequency-regulation reserve capacity of the conventional energy power generator set i in the time period k, respectively, $$PR_{j,k}^{wind},\ SR_{j,k}^{wind} \text{ and } TR_{j,k}^{wind}$$

representing a primary frequency-regulation reserve capacity, a secondary frequency-regulation reserve capacity, and a tertiary frequency-regulation reserve capacity of the renewable energy power generator set j in the time period k, respectively, $$z_{i,k}^{gen}$$

representing a post-fault secondary frequency-regulation reserve deployment of the conventional energy power generator set i in the time period k, and $$z_{i,k}^{wind}$$

representing a post-fault secondary frequency-regulation reserve deployment of the renewable energy power generator set j in the time period k.

9. The method of claim 4, wherein the power balance constraint condition of the power system is:

$$\sum_i P_{i,k}^{gen} + \sum_j P_{j,k}^{wind} = \sum_d P_{d,k}^{load} \forall k, \text{ wherein } P_{i,k}^{gen}$$

represents a planned output of the conventional energy power generator set i in the time period k, $$P_{j,k}^{wind}$$

represents an actual output of the renewable energy power generator set j in the time period k, $$P_{d,k}^{load}$$

represents a predicted value of a load d in the time period k; and the constraint condition of the reserve capacity of the power system after a tertiary frequency regulation is:

$$\sum_i TR_{i,k}^{gen} + \sum_j TR_{j,k}^{wind} = 5\% \sum_d P_{d,k}^{load} \forall k, \text{ wherein } TR_{i,k}^{gen}$$

represents a tertiary frequency-regulation reserve capacity of the conventional energy power generator set i in the time period k, $$TR_{j,k}^{wind}$$

represents a tertiary frequency-regulation reserve capacity of the renewable energy power generator set j in the time period k.

10. A computer device comprising a memory and a processor, wherein a computer program is stored in the memory, and the processor, when executing the computer program, performs steps of the method of claim 1.

11. A non-transitory computer readable storage medium, having a computer program stored thereon, wherein the computer program, when executed by a processor, causes the processor to perform steps of the method of claim 1.

12. A method of frequency regulation of a power system involving renewable energy power generation, comprising:

constructing a system frequency dynamic model according to parameters associated with power generator sets in the power system, the power generator sets comprising a renewable energy power generator set and a conventional energy power generator set;

calculating secure operation indexes of the power system according to the system frequency dynamic model of the power system; and obtaining system comprehensive cost indexes of the power system, constructing a reserve allocation model of the power generator sets according to the system comprehensive cost indexes and the secure operation indexes of the power system, and regulating a system frequency of the power system according to the reserve allocation model, comprise:

constructing the system comprehensive cost indexes based on the parameters of the conventional energy power generator set and the parameters of the renewable energy power generator set, and constructing an optimization objective function based on the system comprehensive cost indexes;

constructing constraint conditions of the secure operation indexes of the power system;

constructing the reserve allocation model of the power generator sets according to the optimization objective function and the constraint conditions; and calculating an optimal solution of the reserve allocation model of the power generator sets, and adjusting a reserve capacity of the renewable energy power generator set and a reserve capacity of the conventional energy power generator set based on the optimal solution to regulate the system frequency of the power system.

13. The method of claim 12, wherein the constructing the constraint conditions of the secure operation indexes of the power system, comprises:

constructing combination constraint conditions and operation constraint conditions of the conventional energy power generator set, and operation constraint conditions of the renewable energy power generator set;

constructing a power balance constraint condition of the power system and a constraint condition of the reserve capacity of the power system after a tertiary frequency regulation;

constructing a line power flow constraint condition of the power system in a normal operation condition and a line power flow constraint condition of the power system after the primary frequency regulation; and constructing constraint conditions of a secondary frequency regulation of the power system, and constraint conditions of a frequency security of the power system in a dynamic of the primary frequency regulation.

14. The method of claim 12, wherein the optimization objective function comprises:

$$\min \sum_k \begin{pmatrix} \sum_i \left(C_i^{fixed} u_{i,k} + C_i^{SU} z_{i,k}^{SU} + C_i^{SD} z_{i,k}^{SD} + C_{i,k}^{incr} P_{i,k}^{gen}\right) + \\ \sum_j C_j^{pen}\left(P_{j,k}^{mrrp} - P_{j,k}^{wind} - PR_{j,k}^{wind} - SR_{j,k}^{wind} - TR_{j,k}^{wind}\right) \end{pmatrix}$$

$$\text{over} \begin{Bmatrix} u_{i,k}, z_{i,k}^{SU}, z_{i,k}^{SD}, v_{i,k}^{gen}, v_{j,k}^{wind}, P_{i,k}^{gen}, P_{j,k}^{wind}, z_{i,k}^{gen}, z_{j,k}^{wind} \\ PR_{i,k}^{gen}, PR_{j,k}^{wind}, SR_{i,k}^{gen}, SR_{j,k}^{wind}, TR_{i,k}^{gen}, TR_{j,k}^{wind} \end{Bmatrix}$$

wherein the parameters of the conventional energy power generator set comprise:

$$C_i^{fixed}$$

representing a fixed cost coefficient of power generation, $$C_i^{SU}$$

representing a set start-up cost coefficient, $$C_i^{SD}$$

representing a set shutdown cost coefficient, $$C_i^{incr}$$

representing a variable cost coefficient of power generation, $u_{i,k}$ representing an on/off state of the conventional energy power generator set i in the time period k, and a Boolean variable $$v_{i,k}^{gen}$$

representing whether the conventional energy power generator set i participates in the primary frequency regulation or not in the time period k; and wherein the parameters of the renewable energy power generator set comprise:

$$C_j^{pen}$$

representing a wind curtailment penalty coefficient of the renewable energy power generator set j, $$P_{j,k}^{mppt}$$

representing a predicted value of a maximum power point tracking of the renewable energy power generator set j in the time period k, a Boolean variable $$v_{j,k}^{wind}$$

representing whether the renewable energy power generator set j participates in the primary frequency regulation or not in the time period k;

the system comprehensive cost indexes comprise: a decision variable $u_{i,k}$ representing the on/off state of the conventional energy power generator set i in the time period k, $$z_{i,k}^{SU} \text{ and } z_{i,k}^{SD}$$

representing startup and shutdown actions of the conventional energy power generator set i in the time period k, respectively, $$P_{i,k}^{gen}$$

representing a planned output of the conventional energy power generator set i in the time period k, $$P_{j,k}^{wind}$$

representing an actual output of the renewable energy power generator set j in the time period k, $$PR_{i,k}^{gen}, SR_{i,k}^{gen} \text{ and } TR_{i,k}^{gen}$$

representing a primary frequency-regulation reserve capacity, a secondary frequency-regulation reserve capacity, and a tertiary frequency-regulation reserve capacity of the conventional energy power generator set i in the time period k, respectively, $$PR_{j,k}^{wind}, SR_{j,k}^{wind} \text{ and } TR_{jk}^{wind}$$

representing a primary frequency-regulation reserve capacity, a secondary frequency-regulation reserve capacity, and a tertiary frequency-regulation reserve capacity of the renewable energy power generator set j in the time period k, respectively, $$z_{i,k}^{gen}$$

representing a post-fault secondary frequency-regulation reserve deployment of the conventional energy power generator set i in the time period k, and $$z_{j,k}^{wind}$$

representing a post-fault secondary frequency-regulation reserve deployment of the renewable energy power generator set j in the time period k.

15. The method of claim 13, wherein the power balance constraint condition of the power system is:

$$\sum_i P_{i,k}^{gen} + \sum_j P_{j,k}^{wind} = \sum_d P_{d,k}^{load} \forall k, \text{ wherein } P_{i,k}^{gen}$$

represents a planned output of the conventional energy power generator set i in the time period k, $$P_{j,k}^{wind}$$

represent an actual output of the renewable energy power generator set j in the time period k, $$P_{d,k}^{load}$$

represent a predicted value of a load d in the time period k; and the constraint condition of the reserve capacity of the power system after a tertiary frequency regulation is:

$$\sum_i TR_{i,k}^{gen} + \sum_j TR_{j,k}^{wind} = 5\% \sum_d P_{d,k}^{load} \forall k, \text{ wherein } TR_{i,k}^{gen}$$

represents a tertiary frequency-regulation reserve capacity of the conventional energy power generator set i in the time period k, $$TR_{j,k}^{wind}$$

represent a tertiary frequency-regulation reserve capacity of the renewable energy power generator set j in the time period k.

* * * * *